(12) United States Patent
Fridman et al.

(10) Patent No.: US 12,070,986 B2
(45) Date of Patent: *Aug. 27, 2024

(54) APPARATUS, SYSTEM AND METHOD OF ACTIVE NOISE CONTROL (ANC) IN A VEHICLE

(71) Applicant: SILENTIUM LTD., Nes Ziona (IL)

(72) Inventors: Tzvi Fridman, Nes Tziona (IL); Ziv Hermon, Maccabim (IL); Omer Aziza, Givataim (IL); Gal Cope, Herzliya (IL)

(73) Assignee: SILENTIUM LTD., Nes Ziona (IL)

( * ) Notice: Subject to any disclaimer, the term of this patent is extended or adjusted under 35 U.S.C. 154(b) by 518 days.

This patent is subject to a terminal disclaimer.

(21) Appl. No.: 17/225,891

(22) Filed: Apr. 8, 2021

(65) Prior Publication Data

US 2021/0221196 A1 Jul. 22, 2021

Related U.S. Application Data

(63) Continuation of application No. 17/080,047, filed on Oct. 26, 2020, now Pat. No. 11,034,211.

(Continued)

(51) Int. Cl.
*G10K 11/178* (2006.01)
*B60H 1/00* (2006.01)

(52) U.S. Cl.
CPC ..... *B60H 1/00735* (2013.01); *B60H 1/00557* (2013.01); *B60H 1/00585* (2013.01);
(Continued)

(58) Field of Classification Search
CPC .................................................. G10K 11/1781
See application file for complete search history.

(56) References Cited

U.S. PATENT DOCUMENTS 5,129,003 A 7/1992 Saruta
5,245,664 A * 9/1993 Kinoshite ........ G10K 11/17883
381/71.4
(Continued)

FOREIGN PATENT DOCUMENTS

CN 107424596 12/2017
CN 207068465 U 3/2018
(Continued)

OTHER PUBLICATIONS

International Search Report and the Written Opinion for International Application No. PCT/IB2022/056026, mailed on Oct. 20, 2022, 18 pages.

(Continued)

*Primary Examiner* — Suresh Suryawanshi
(74) *Attorney, Agent, or Firm* — Shichrur & Co.

(57) ABSTRACT

For example, an apparatus may include an input to receive input information including a Heating, Ventilation and Air Conditioning (HVAC) input including HVAC configuration information corresponding to a configuration of an operation of an HVAC system of a vehicle; a plurality of noise inputs representing acoustic noise at a plurality of noise sensing locations; and a plurality of residual-noise inputs representing acoustic residual-noise at a plurality of residual-noise sensing locations within at least one sound control zone in the vehicle; a controller configured to determine a sound control pattern to control sound within the at least one sound control zone in the vehicle, the controller configured to determine the sound control pattern based on the HVAC input, the plurality of noise inputs and the plurality of residual-noise inputs; and an output to output the sound control pattern to a plurality of acoustic transducers.

26 Claims, 13 Drawing Sheets

Related U.S. Application Data

(60) Provisional application No. 62/926,510, filed on Oct. 27, 2019.

(52) U.S. Cl.
CPC .... *G10K 11/1781* (2018.01); *G10K 11/17813* (2018.01); *G10K 11/17854* (2018.01); *G10K 11/17883* (2018.01); *B60H 2001/006* (2013.01); *H04R 2499/13* (2013.01)

(56) References Cited

U.S. PATENT DOCUMENTS

| | | | |
|---|---|---|---|
| 5,416,844 | A | 5/1995 | Nakaji et al. |
| 9,431,001 | B2 | 8/2016 | Cherkassky et al. |
| 11,034,211 | B2 | 6/2021 | Fridman et al. |
| 11,328,702 | B1 | 5/2022 | Xiao et al. |
| 11,604,091 | B1 | 3/2023 | Kim |
| 2005/0075865 | A1 | 4/2005 | Rapoport |
| 2006/0269078 | A1 | 11/2006 | Sakamoto et al. |
| 2010/0080399 | A1 | 4/2010 | Pfau et al. |
| 2010/0082201 | A1 | 4/2010 | Pfau et al. |
| 2012/0257763 | A1 | 10/2012 | Bowden et al. |
| 2012/0288110 | A1 | 11/2012 | Cherkassky et al. |
| 2013/0204617 | A1 | 8/2013 | Kuo et al. |
| 2015/0193195 | A1 | 7/2015 | Lin et al. |
| 2015/0224848 | A1 | 8/2015 | Eisenhour |
| 2015/0300684 | A1 | 10/2015 | Mehta et al. |
| 2016/0086592 | A1* | 3/2016 | Saxman ............. G10K 11/1785 381/71.4 |
| 2016/0111078 | A1* | 4/2016 | Barath ............. G10K 11/17879 381/71.7 |
| 2016/0163303 | A1 | 6/2016 | Benattar et al. |
| 2017/0032806 | A1 | 2/2017 | Konjeti et al. |
| 2017/0213541 | A1 | 7/2017 | MacNeille et al. |
| 2017/0323639 | A1 | 11/2017 | Tzirkel-Hancock et al. |
| 2018/0012589 | A1 | 1/2018 | MacNeille et al. |
| 2018/0070191 | A1* | 3/2018 | Chang .................. G10K 11/178 |
| 2018/0190258 | A1 | 7/2018 | Mohammad et al. |
| 2018/0206055 | A1 | 7/2018 | Di Censo et al. |
| 2019/0189103 | A1* | 6/2019 | Biermeier ................ H04R 3/04 |
| 2019/0232867 | A1 | 8/2019 | Bednar et al. |
| 2020/0074975 | A1 | 3/2020 | Torres |
| 2020/0193956 | A1 | 6/2020 | Kim et al. |
| 2020/0218501 | A1 | 7/2020 | Fridman et al. |
| 2021/0014600 | A1 | 1/2021 | Neumaier et al. |
| 2024/0161725 | A1 | 5/2024 | Fridman et al. |
| 2024/0177703 | A1 | 5/2024 | Fridman et al. |

FOREIGN PATENT DOCUMENTS

| | | |
|---|---|---|
| CN | 111091805 | 5/2020 |
| CN | 111968613 | 11/2020 |
| EP | 1 577 879 | 9/2005 |
| JP | 2010156826 | 7/2010 |
| KR | 20190047976 A * | 5/2019 |
| WO | 2007/028922 A1 | 3/2007 |
| WO | 2008090544 | 7/2008 |
| WO | 2019124772 | 6/2019 |
| WO | 2021250237 | 12/2021 |

OTHER PUBLICATIONS

Hyundai Motor Company Showcases Next-Generation Separated Sound Zone Technology. (Retrieved on Oct. 6, 2022). Retrieved from the Internet: <https://www.hyundai.com/worldwide/en/company/newsroom/hyundai-motor-company-showcases-next-generationseparated-sound-zone-technology-0000016024> Hyundai Motor Company, Aug. 13, 2018 (Aug. 13, 2018), 2 pages.
Office Action for U.S. Appl. No. 17/852,104, mailed on Jan. 19, 2023, 30 pages.
Kuo et al.; "Active noise control: a tutorial review"; Jul. 1999; Proceedings of the IEEE; vol. 87, No. 6; pp. 943-973. (Year: 1999).
Office Action for U.S. Appl. No. 17/852,104, mailed on May 22, 2023, 33 pages.
International Search Report and the Written Opinion for International Application No. PCT/IB2020/060034, mailed on Feb. 25, 2021, 11 pages.
Notice of Allowance for U.S. Appl. No. 17/080,047, mailed on Feb. 9, 2021, 14 pages.
Corrected Notice of Allowability for U.S. Appl. No. 17/080,047, mailed on Mar. 26, 2021, 8 pages.
International Preliminary Report on Patentability for International Application No. PCT/IB2020/060034, mailed on May 12, 2022, 7 pages.
Notice of Allowance for U.S. Appl. No. 17/852,104, mailed on Sep. 5, 2023, 10 pages.
Advisory Action for U.S. Appl. No. 17/852,104, mailed on Aug. 21, 2023, 4 pages.
Search Report for European Patent Application No. 20881145.5, mailed on Nov. 15, 2023, 12 pages.
International Search Report and the Written Opinion for International Application No. PCT/IB2023/056647, mailed on Nov. 15, 2023, 34 pages.
International Preliminary Report on Patentability for International Application No. PCT/IB2022/056026, mailed on Jan. 11, 2024, 8 pages.
Office Action for U.S. Appl. No. 18/215,055, mailed on Apr. 25, 2024, 29 pages.

* cited by examiner

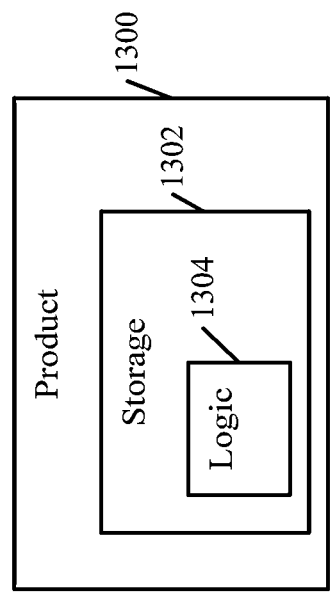

APPARATUS, SYSTEM AND METHOD OF ACTIVE NOISE CONTROL (ANC) IN A VEHICLE

CROSS-REFERENCE

This application claims the benefit of and priority from U.S. Provisional Patent Application No. 62/926,510, entitled "APPARATUS, SYSTEM AND METHOD OF ACTIVE NOISE CONTROL (ANC) BASED ON HEATING, VENTILATION AND AIR CONDITIONING (HVAC) CONFIGURATION", filed Oct. 27, 2019, the entire disclosure of which is incorporated herein by reference.

TECHNICAL FIELD

Embodiments described herein generally relate to Active Noise Control (ANC).

BACKGROUND

A Heating, Ventilation and Air Conditioning (HVAC) system on a vehicle controls the micro-climate inside a cabin of the vehicle, for example, for improved user experience, e.g., heating, cooling, ventilation, and the like, and/or for safety issues, e.g., defrost, defog of the front and/or rear windows.

The HVAC system may be operated, e.g., turned on, by a user of the vehicle, for example, after the vehicle is turned on, and may continue to operate, e.g., until the vehicle is turned off.

The HVAC system may be based on a blower driving air at mid or high speed, which may create a considerable amount of noise. Therefore, operation of the system may result in continuous noise during the entire or most of the vehicle operation time, which may create an acoustic disturbance to the driver and passengers.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 13 is a schematic block diagram illustration of a product of manufacture, in accordance with some demonstrative embodiments.

DETAILED DESCRIPTION

Figure 1:
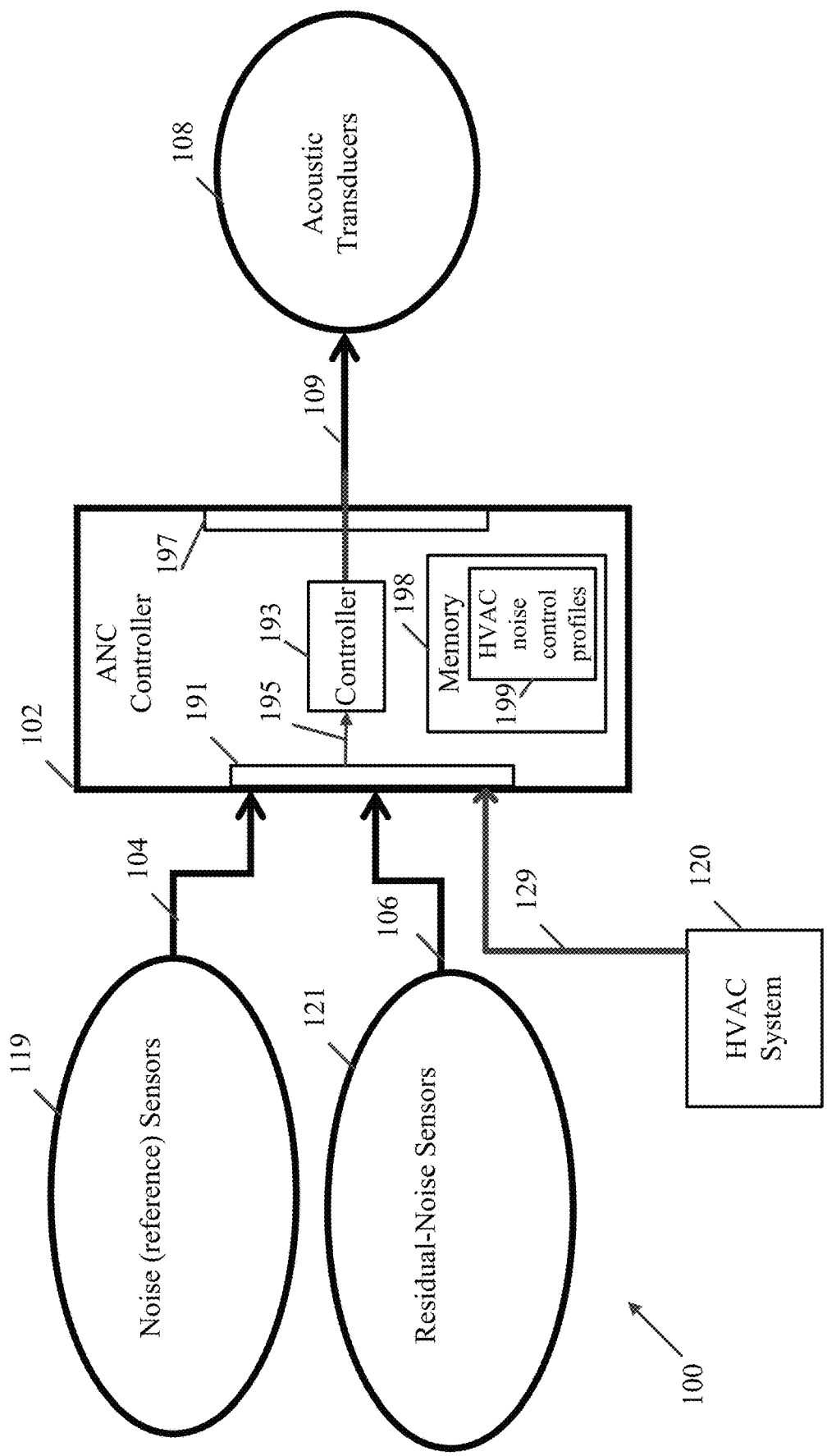
FIG. 1 is a schematic block diagram illustration of an Active Noise Control (ANC) system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein include, for example, "multiple" or "two or more". For example, "a plurality of items" includes two or more items.

Some portions of the following detailed description are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

Some demonstrative embodiments include systems and methods, which may be efficiently implemented for controlling noise, for example, reducing or eliminating undesirable noise, e.g., at least noise of generally low frequencies, as described below.

Some demonstrative embodiments may include methods and/or systems of Active Noise Control (ANC) configured to control, reduce and/or eliminate the noise energy and/or wave amplitude of one or more acoustic patterns ("primary patterns") produced by one or more noise sources, which may include known and/or unknown noise sources.

In some demonstrative embodiments, an ANC system may be configured to produce a noise control pattern (also referred to as "sound control pattern" or "secondary pattern"), e.g., including a destructive noise pattern and/or any other sound control pattern, which may be based on one or more of the primary patterns, for example, such that a controlled sound zone, for example, a reduced noise zone, e.g., a quiet zone, may be created by a combination of the secondary and primary patterns.

In some demonstrative embodiments, the ANC system may be configured to control, reduce and/or eliminate noise within a predefined location, area or zone ("the noise-control zone", also referred to as the "quiet zone", or "Quiet Bubble™"), without, for example, regardless of, and/or without using a-priori information regarding the primary patterns and/or the one or more noise sources.

For example, the ANC system may be configured to control, reduce and/or eliminate noise within the noise control zone, e.g., independent of, regardless of and/or without knowing in advance one or more attributes of one or more of the noise sources and/or one or more of the primary patterns, for example, the number, type, location and/or other attributes of one or more of the primary patterns and/or one or more of the noise sources.

Some demonstrative embodiments are described herein with respect to ANC systems and/or methods configured to reduce and/or eliminate the noise energy and/or wave amplitude of one or more acoustic patterns within a quiet zone.

However, in other embodiments, any other ANC and/or sound control systems and/or methods may be configured to control in any other manner any other sound energy and/or wave amplitude of one or more acoustic patterns within a sound control zone, for example, to affect, alter and/or modify the sound energy and/or wave amplitude of one or more acoustic patterns within a predefined zone.

In one example, the ANC systems and/or methods may be configured to selectively reduce and/or eliminate the noise energy and/or wave amplitude of one or more types of acoustic patterns within the noise control zone and/or to selectively increase and/or amplify the noise energy and/or wave amplitude of one or more other types of acoustic patterns within the noise control zone; and/or to selectively maintain and/or preserve the noise energy and/or wave amplitude of one or more other types of acoustic patterns within the noise control zone.

In some demonstrative embodiments, the ANC system may be configured to control, reduce, and/or eliminate the noise energy and/or wave amplitude of one or more of the primary patterns within the quite zone.

In some demonstrative embodiments, the ANC system may be configured to control, reduce, and/or eliminate noise within the noise control zone in a selective and/or configurable manner, e.g., based on one or more predefined noise pattern attributes, such that, for example, the noise energy, wave amplitude, phase, frequency, direction and/or statistical properties of one or more first primary patterns may be affected by the secondary pattern, while the secondary pattern may have a reduced effect or even no effect on the noise energy, wave amplitude, phase, frequency, direction and/or statistical properties of one or more second primary patterns, e.g., as described below.

In some demonstrative embodiments, the ANC system may be configured to control, reduce and/or eliminate the noise energy and/or wave amplitude of the primary patterns on a predefined envelope or enclosure surrounding and/or enclosing the noise control zone.

In one example, the noise control zone may include a two-dimensional zone, e.g., defining an area in which the noise energy and/or wave amplitude of one or more of the primary patterns is to be controlled, reduced and/or eliminated.

According to this example, the ANC system may be configured to control, reduce and/or eliminate the noise energy and/or wave amplitude of the primary patterns along a perimeter surrounding the noise control zone.

In one example, the noise control zone may include a three-dimensional zone, e.g., defining a volume in which the noise energy and/or wave amplitude of one or more of the primary patterns is to be controlled, reduced and/or eliminated. According to this example, the ANC system may be configured to control, reduce and/or eliminate the noise energy and/or wave amplitude of the primary patterns on a surface enclosing the three-dimensional volume.

In one example, the noise control zone may include a spherical volume and the ANC system may be configured to control, reduce and/or eliminate the noise energy and/or wave amplitude of the primary patterns on a surface of the spherical volume.

In another example, the noise control zone may include a cubical volume and the ANC system may be configured to control, reduce and/or eliminate the noise energy and/or wave amplitude of the primary patterns on a surface of the cubical volume.

In other embodiments, the noise control zone may include any other suitable volume, which may be defined, for example, based on one or more attributes of a location at which the noise control zone is to be maintained.

Reference is now made to FIG. 1, which schematically illustrates an ANC system 100, in accordance with some demonstrative embodiments.

Figure 2:
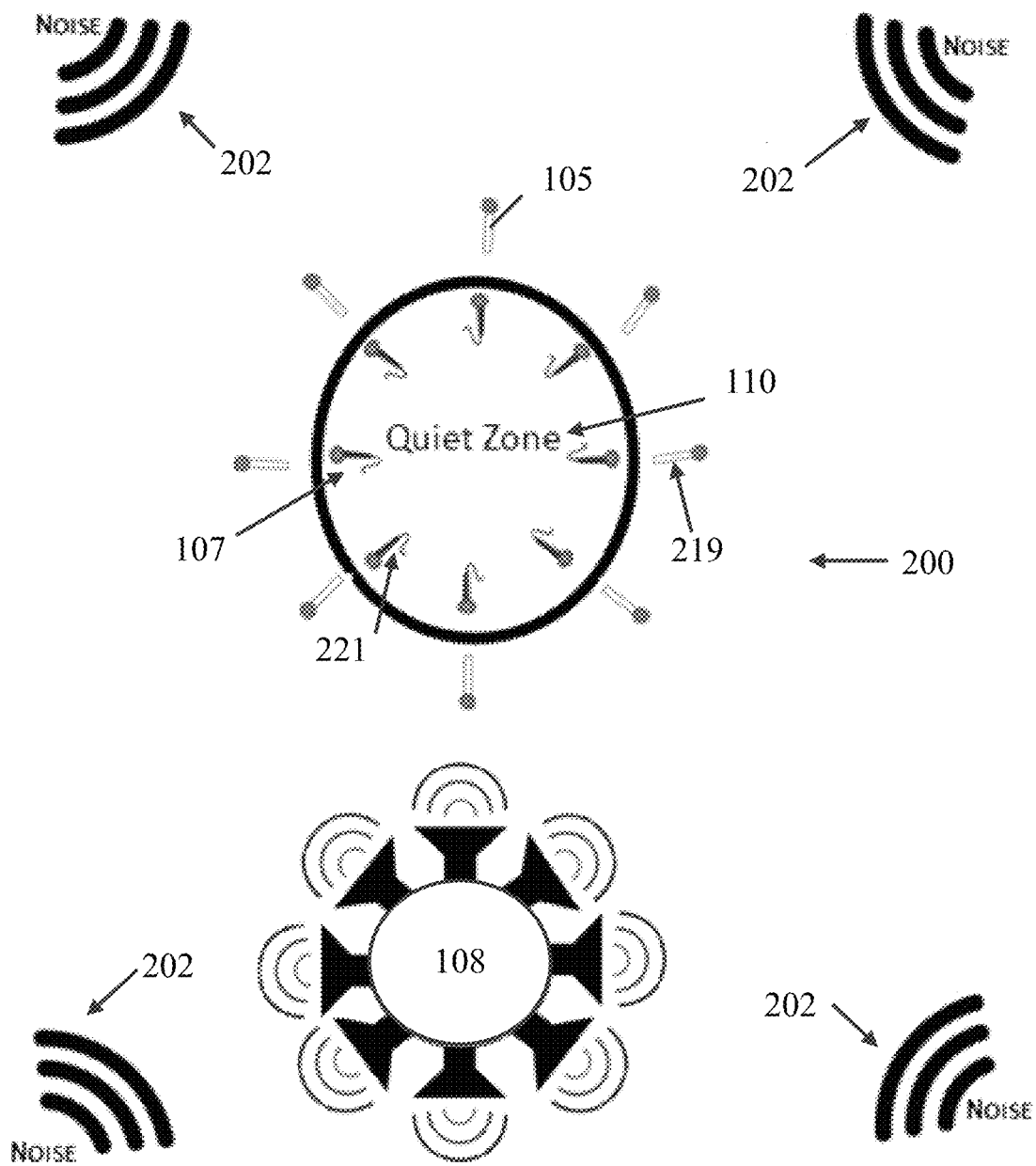
FIG. 2 is a schematic illustration of a deployment scheme of components of the ANC system of FIG. 1, in accordance with some demonstrative embodiments.

Reference is also made to FIG. 2, which schematically illustrates a deployment scheme 200 of components of an ANC system, in accordance with some demonstrative embodiments. For example, deployment scheme 200 may include ea deployment of one or more elements of the ANC system, 100 of FIG. 1.

In some demonstrative embodiments, ANC system 100 may include, operate as, and/or perform functionalities of, an Active Noise Cancelation system.

In some demonstrative embodiments, ANC system 100 may include a controller 102 to control sound within at least one sound-control zone 110, e.g., as described in detail below.

In some demonstrative embodiments, controller 102 may include, or may be implemented, partially or entirely, by circuitry and/or logic, e.g., one or more processors including circuitry and/or logic, and/or memory circuitry and/or logic. Additionally or alternatively, one or more functionalities of radar controller 102 may be implemented by logic, which may be executed by a machine and/or one or more processors, e.g., as described below.

In one example, controller 102 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In one example, at least part of the functionality of controller 102 may be implemented by an integrated circuit, for example, a chip, e.g., a System on Chip (SoC).

In other embodiments, controller 102 may be implemented by any other logic and/or circuitry, and/or according to any other architecture.

In some demonstrative embodiments, the predefined sound-control zone 110 may include an enclosed space, e.g., as described below.

In some demonstrative embodiments, the enclosed space may include a cabin of a vehicle, for example, a car, a bus, and/or a truck, e.g., as described below.

In some demonstrative embodiments, the enclosed space may include any other cabin, e.g., a cabin of an airplane, a cabin of a train, a cabin of a medical system, an area of a room, and the like.

In other embodiments, the enclosed space may include any other enclosed part or area of a space.

In some demonstrative embodiments, sound-control zone 110 may be located inside a vehicle, and ANC system 100 may be deployed inside of the vehicle.

In some demonstrative embodiments, the vehicle may include a Heating, Ventilation and Air Conditioning (HVAC) system 120 configured to control the microclimate inside a cabin of the vehicle.

In some demonstrative embodiments, ANC system 100 may be configured to control sound within the vehicle based on an HVAC input 129 including HVAC configuration information corresponding to a configuration of an operation of HVAC system 120 of the vehicle, e.g., as described below.

Some demonstrative embodiments are described herein with respect to HVAC system configured to heat, ventilate and/or air-condition the interior of the vehicle. However, in other embodiments, any other system configured to control or modify the microclimate inside the vehicle may be used.

In some demonstrative embodiments, HVAC system 120 may improve user experience, e.g., by heating, cooling, ventilation, and the like the environment, of a user of the vehicle, e.g., a driver or passenger, within the vehicle.

In some demonstrative embodiments, ANC system 100 may be configured to control sound and/or noise within zone 110, for example, to provide an improved driving experience for driver and/or one or more passengers of the vehicle, for example, by controlling sound and/or noise within zone 110 in a way which provide an improved music and/or sound experience within the vehicle, an improved quality of phone conversations, and/or the like.

In some demonstrative embodiments, HVAC system 120 may improve safety of the user, for example, e.g., defrost, defog, or the like, of the front and/or rear windows.

In some demonstrative embodiments, HVAC system 120 may be operated, e.g., turned on, by the user of the vehicle, for example, after the vehicle is turned on, e.g., ignited and/or switched on, and may continue to operate, e.g., until the vehicle is turned off, or the HVAC system is turned-off or stopped fro any other reason.

In some demonstrative embodiments, HVAC system 120 may be based on and/or may include one or more air-moving devices, for example, blowers, fans, and the like, e.g., to drive air in high speed, which may create a considerable amount of noise.

In some demonstrative embodiments, operation of HVAC system 120 may result in continuous noise, e.g., at different noise profiles, during the entirety of, or most of, the vehicle operation time, which may create an acoustic disturbance and overload, for example, if the noise created by HVAC system 120 is not reduced or cancelled.

In some demonstrative embodiments, ANC system 100 may be configured to reduce or even cancel the noise created by HVAC system 120, for example, during vehicle operation time, e.g., as described below.

In some demonstrative embodiments, ANC system 100 may be configured to reduce or even cancel noise produced by HVAC system 120, for example, while taking into account various noise profiles of HVAC system 120, e.g., as described below.

In some demonstrative embodiments, ANC system 100 may be configured to reduce or even cancel noise, which is emitted from primary noise sources of HVAC system 120, for example, from the blower, the fan and/or the compressor.

In some demonstrative embodiments, one or more elements of ANC system 100 may be configured and/or deployed based one or more attributes of a physical architecture of HVAC system 120, for example, a physical architecture of one or more air ducts of HVAC system, and/or a count, location, size and/or shape of one or more air outlets of the HVAC system 120, e.g., as described below.

In some demonstrative embodiments, ANC system 100 may be configured to reduce or even cancel the noise, which is emitted from secondary noise sources of HVAC system 120. For example, since air ducts in HVAC system 120 may not be straight, a bend or curve of the ducts may create additional noise sources.

In some demonstrative embodiments, ANC system 100 may be configured to reduce or even cancel noise created by any other configuration, architecture, layout and/or shape of the air ducts.

In some demonstrative embodiments, sound control zone 110 may include a three-dimensional (3D) zone. For example, sound control zone 110 may include a spherical zone.

In another example, sound control zone 110 may include any other 3D zone.

In some demonstrative embodiments, ANC controller 102 may include, or may be implemented with, an input 191, which may be configured to receive input information 195, e.g., as described below.

In some demonstrative embodiments, the input information 195 may include the HVAC input 129 including HVAC configuration information corresponding to the configuration of an operation of HVAC system 120 of the vehicle, e.g., as described below.

In some demonstrative embodiments, input 191 may be configured to receive the HVAC input 129 via a Controller Area Network (CAN) bus of the vehicle, an A to B (A2B) bus of the vehicle, a Media Oriented Systems Transport (MOST) bus of the vehicle, and/or an Ethernet bus of the vehicle.

In other embodiments, input 191 may be configured to receive the HVAC input 129 via a wired link or connection, a wireless link or connection, and/or any other communication mechanism, connection, link, bus and/or interface.

In some demonstrative embodiments, the input information 195 may include a plurality of noise inputs 104, e.g., from one or more acoustic sensors (also referred to as "primary sensors", "noise sensors" or "reference sensors") 119, representing acoustic noise at a plurality of predefined noise sensing locations 105, e.g., as described below.

In some demonstrative embodiments, the plurality of noise sensing locations 105 may include a plurality of HVAC noise sensing locations, which are defined with respect to one or more components of the HVAC system 120, e.g., as described below.

In some demonstrative embodiments, the plurality of HVAC noise sensing locations may include a location of a blower of the HVAC system 120, a location of a fan of the HVAC system 120, a location of a compressor of the HVAC system 120, a location of an air outlet of the HVAC system 120, and/or a location in an air duct of the HVAC system 120, e.g., as described below.

In some demonstrative embodiments, the plurality of HVAC noise sensing locations may include a location of a curved portion of an air duct of the HVAC system, e.g., as described below.

In other embodiments, the plurality of HVAC noise sensing locations may include any other additional or alternative location of any other component of HVAC system 120.

In some demonstrative embodiments, the plurality of noise sensing locations 105 may include one or more other noise sensing locations 105 at one or more other locations, e.g., which are independent of and/or unrelated to components of the HVAC system 120.

In some demonstrative embodiments, ANC controller 102 may receive noise inputs 104 from one or more acoustic sensors 119, which may include one or more physical sensors, e.g., microphones, accelerometers, tachometers and the like, located at one or more of locations 105, and/or one or more virtual sensors configured to estimate the acoustic noise at one or more of locations 105, e.g., as described below.

In some demonstrative embodiments, the input information 195 may include a plurality of residual-noise inputs 106 e.g., from one or more residual-noise acoustic sensors (also referred to as "error sensors", or "secondary sensors") 121, representing acoustic residual-noise at a plurality of predefined residual-noise sensing locations 107, which are located within sound-control zone 110, e.g., as described below.

In some demonstrative embodiments, ANC controller 102 may receive residual-noise inputs 106 from one or more acoustic sensors 121, which may include one or more physical sensors, e.g., microphones, accelerometers tachometers and the like, located at one or more of locations 107, and/or from one or more virtual sensors configured to estimate the residual-noise at one or more of locations 107, e.g., as described below.

In some demonstrative embodiments, ANC system 100 may include at least one acoustic transducer 108, e.g., a speaker, a shaker, and/or any other actuator. For example, ANC controller 102 may control acoustic transducer 108 to generate an acoustic sound control pattern configured to control the sound within sound control zone 110, e.g., as described in detail below.

In some demonstrative embodiments, ANC controller 102 may include a controller 193 configured to determine the sound control pattern to control sound within the at least one sound control zone 110 in the vehicle, e.g., as described below.

In some demonstrative embodiments, controller 193 may be configured to determine the sound control pattern based on the HVAC input 129, the plurality of noise inputs 104 and the plurality of residual-noise inputs, e.g., as described below.

In some demonstrative embodiments, ANC controller 102 may include an output 197 to output the sound control pattern to a plurality of acoustic transducers. For example, output 197 may be configured to output the sound control pattern in the form of a sound control signal 109 to control acoustic transducer 108, e.g., as described below.

In some demonstrative embodiments, the HVAC input 129 may include HVAC configuration information including HVAC mode information corresponding to a mode of operation of the HVAC system 120, e.g., as described below.

In some demonstrative embodiments, the HVAC mode information may correspond to an HVAC heating mode, an HVAC cooling mode, an HVAC defrosting mode, an HVAC fan mode, an HVAC ventilation mode, an HVAC dry mode, and/or an HVAC defogging mode, e.g., as described below.

In other embodiments, the HVAC mode information may correspond to any other additional or alternative mode of operation of HVAC system 120.

In some demonstrative embodiments, controller 193 may be configured to determine the sound control pattern for sound control signal 109, for example, based on the HVAC mode information, e.g., as described below.

In some demonstrative embodiments, the HVAC input 129 may include HVAC configuration information including HVAC fan information corresponding to an operation of a blower or fan of the HVAC system, e.g., as described below.

In some demonstrative embodiments, the HVAC fan information may correspond to a fan turbo mode, a fan quit mode, and/or a fan speed.

In other embodiments, the HVAC fan information may correspond to any other additional or alternative mode of operation of the fan and/or blower of the HVAC system 120.

In some demonstrative embodiments, controller 193 may be configured to determine the sound control pattern for sound control signal 109, for example, based on the HVAC fan information, e.g., as described below.

In some demonstrative embodiments, the HVAC input 129 may include HVAC configuration information including HVAC climate information corresponding to a climate setting of the HVAC system 120, e.g., as described below.

In some demonstrative embodiments, the HVAC climate information may correspond to a temperature setting, and/or a humidity setting.

In other embodiments, the HVAC climate information may correspond to any other additional or alternative climate setting of the HVAC system 120.

In some demonstrative embodiments, controller 193 may be configured to determine the sound control pattern for sound control signal 109, for example, based on the HVAC climate information, e.g., as described below.

In other embodiments, the HVAC input 129 may include any other additional or alternative HVAC configuration information corresponding to any other additional or alternative configuration of the operation of the HVAC system.

In other embodiments, controller 193 may be configured to determine the sound control pattern for sound control signal 109 based on any other additional or alternative HVAC configuration information corresponding to any other additional or alternative configuration of the operation of the HVAC system.

In some demonstrative embodiments, controller 193 may be configured to determine the sound control pattern for sound control signal 109 based on the HVAC input 129, for example, such that the sound control pattern is to reduce or eliminate noise from the HVAC system 120 in the at least one sound control zone 110, e.g., as described below.

In other embodiments, controller 193 may be configured to determine the sound control pattern for sound control signal 109 based on the HVAC input 129 according to any other sound control scheme, e.g., to reduce or eliminate some of the noise from the HVAC system 120, and/or to affect the noise from the HVAC system 120 in any other manner.

In some demonstrative embodiments, controller 193 may be configured to determine a first sound control pattern based on first HVAC configuration information representing a first configuration of the operation of the HVAC system 120, e.g., as described below.

In some demonstrative embodiments, controller 193 may be configured to determine a second sound control pattern, different from the first sound control pattern, based on second HVAC configuration information representing a second configuration of the operation of the HVAC system 120, which is different from the first configuration of the operation of the HVAC system 120, e.g., as described below.

In one example, the first and second configurations of the operation of the HVAC system 120 may both have a same mode of operation with one or more other different configurations, e.g., a fan setting, a climate setting, and/or any other mode or setting.

For example, the first sound control pattern may be based on the HVAC configuration information representing a heating mode of operation at a first fan speed setting, and/or the second sound control pattern may be based on the HVAC configuration information representing the heating mode of operation at a second fan speed setting.

In another example, the first and second configurations of the operation of the HVAC system 120 may have different modes of operation.

For example, the first sound control pattern may be based on the HVAC configuration information representing a heating mode of operation, and/or the second sound control pattern may be based on the HVAC configuration information representing a cooling mode of operation.

In some demonstrative embodiments, controller 193 may be configured to dynamically update the sound control pattern for sound control signal 109, for example, based on a change in the HVAC configuration information representing a change in the configuration of the operation of the HVAC system, e.g., as described below.

For example, controller 193 may be configured to dynamically monitor the HVAC input 129 to detect, e.g., in real time, changes in the HVAC configuration information.

For example, controller 193 may be configured to dynamically update the sound control pattern for sound control signal 109, e.g., in real time, for example, based on the detected changes in the HVAC configuration information.

In some demonstrative embodiments, controller 193 may be configured to determine a setting of one or more sound control parameters based on the HVAC input 129, and to determine the sound control pattern based on the setting of the one or more sound control parameters, e.g., as described below.

In some demonstrative embodiments, controller 193 may be configured to determine the setting of the one or more sound control parameters based on an HVAC noise control profile which may be based on HVAC input 129, e.g., as described below.

In other embodiments, controller 193 may be configured to determine the setting of the one or more sound control parameters based on any other additional or alternative criterion relating to HVAC input 129.

In some demonstrative embodiments, controller 193 may be configured to determine an HVAC noise control profile based on the HVAC configuration information, e.g., as described below.

In some demonstrative embodiments, controller 193 may be configured to determine the sound control pattern for sound control signal 109 based on the HVAC noise control profile, e.g., as described below.

In some demonstrative embodiments, the HVAC noise control profile may include a setting of one or more sound control parameters, which may be utilized in determining the sound control pattern for sound control signal 109, e.g., as described below.

In some demonstrative embodiments, controller 193 may be configured to determine the sound control pattern for sound control signal 109, for example, based on the setting of the one or more sound control parameters, e.g., as described below.

In some demonstrative embodiments, ANC controller 102 may include a memory 198 to store a plurality of HVAC noise control profiles 199, e.g., as described below.

In some demonstrative embodiments, the plurality of HVAC noise control profiles 199 may be configured corresponding to a plurality of HVAC operation configurations of HVAC systems 120, respectively, e.g., as described below.

In some demonstrative embodiments, an HVAC noise control profile 199 may include a setting of one or more sound control parameters corresponding to an HVAC operation configuration of the plurality of HVAC operation configurations of HVAC system 120, e.g., as described below.

In one example, a first HVAC noise control profile 199 may correspond to a first HVAC operation configuration of HVAC system 120, for example, a heating mode of operation at a first fan speed setting. According to this example, a first HVAC noise control profile 199 corresponding to the first HVAC operation configuration of HVAC system 120 may include, for example, a first setting of one or more sound control parameters. For example, the first setting of the one or more sound control parameters may be configured for sound control to be applied for handling noise to be generated by the HVAC system, e.g., when operated at the heating mode of operation at the first fan speed setting.

In another example, a second HVAC noise control profile 199 may correspond to a second HVAC operation configuration of HVAC system 120, for example, a cooling mode of operation at a second fan speed setting. According to this example, a second HVAC noise control profile 199 corresponding to the second HVAC operation configuration of HVAC system 120 may include, for example, a second setting of one or more sound control parameters. For example, the second setting of the one or more sound control parameters may be configured for sound control to be applied for handling noise to be generated by the HVAC system, e.g., when operated at the cooling mode of operation at the second fan speed setting.

In some demonstrative embodiments, controller 193 may be configured to select from the plurality of HVAC noise control profiles 199 a selected HVAC noise control profile, for example, based on the HVAC configuration information of HVAC input 129, and to determine the sound control pattern for the sound control signal 109, for example, based on the selected HVAC noise control profile, e.g., as described below.

In some demonstrative embodiments, the setting of the one or more sound control parameters may include a prediction filter (PF) setting for determining the sound control pattern based on the plurality of noise inputs 104 and the plurality of residual-noise inputs 106, e.g., as described below.

In some demonstrative embodiments, the setting of the one or more sound control parameters may include a prediction filter weight vector to be applied for determining the sound control pattern based on the plurality of noise inputs 104 and the plurality of residual-noise inputs 106, e.g., as described below.

In some demonstrative embodiments, the setting of the one or more sound control parameters may include an update rate parameter for updating the prediction filter weight vector, e.g., as described below.

In some demonstrative embodiments, the setting of the one or more sound control parameters may include one or more path transfer functions, e.g., including one or more Speaker Transfer Functions (STFs), to be applied for determining the sound control pattern based on the plurality of noise inputs 104 and the plurality of residual-noise inputs 106, e.g., as described below.

In other embodiments, the setting of the one or more sound control parameters may include a setting of one or more additional or alternative parameters, weights, coefficients, and/or functions to be applied for determining the sound control pattern based on the plurality of noise inputs 104 and the plurality of residual-noise inputs 106.

In some demonstrative embodiments, the at least one acoustic transducer 108 may include, for example, an array of one or more acoustic transducers, e.g., at least one suitable speaker, to produce the sound control pattern based on sound control signal 109.

In some demonstrative embodiments, the at least one acoustic transducer 108 may be positioned at one or more locations, which may be determined based on one or more attributes of sound control zone 110, e.g., a size and/or shape of zone 110, one or more expected attributes inputs 104, one or more expected attributes of one or more potential actual noise sources 202, e.g., an expected location and/or directionality of noise sources 202 relative to sound control zone 110, a number of noise sources 202, and the like.

In one example, acoustic transducer 108 may include a speaker array including a predefined number, denoted M, of speakers or a multichannel acoustical source. In some demonstrative embodiments, acoustic transducer 108 may include an array of speakers implemented using a suitable "compact acoustical source" positioned at a suitable location, e.g., external to zone 110. In another example, the array of speakers may be implemented using a plurality of speakers distributed in space, e.g., around sound control zone 110.

In some demonstrative embodiments, one or more of locations 105 may be distributed in any combination of locations on and/or external to the spherical volume, e.g., one or more locations surrounding the spherical volume, e.g., as described below.

In some demonstrative embodiments, one or more locations 105 may be distributed externally to sound control zone 110. For example, one or more of locations 105 may be distributed on, or in proximity to, an envelope or enclosure surrounding sound control zone 110.

For example, if sound control zone 110 is defined by a spherical volume, then one or more of locations 105 may be distributed on a surface of the spherical volume and/or external to the spherical volume.

In some demonstrative embodiments, locations 107 may be distributed within sound control zone 110, for example, in proximity to the envelope of sound control zone 110.

For example, if zone 110 is defined by a spherical volume, then locations 107 may be distributed on a spherical surface having a radius, which is lesser than a radius of sound control zone 110.

In some demonstrative embodiments, ANC system 100 may include one or more first acoustic sensors ("primary sensors") to sense the acoustic noise at one or more of the plurality of noise sensing locations 105.

In some demonstrative embodiments, ANC system 100 may include one or more second acoustic sensors ("error sensors") to sense the acoustic residual-noise at one or more of the plurality of residual-noise sensing locations 107.

In some demonstrative embodiments, one or more of the error sensors and/or one or more of the primary sensors may be implemented using one or more "virtual sensors" ("virtual microphones"). A virtual microphone corresponding to a particular microphone location may be implemented by any suitable algorithm and/or method capable of evaluating an acoustic pattern, which would have be sensed by an actual acoustic sensor located at the particular microphone location.

In some demonstrative embodiments, controller 102 may be configured to simulate and/or perform the functionality of the virtual microphone, e.g., by estimating and/or evaluating the acoustic noise pattern at the particular location of the virtual microphone.

In some demonstrative embodiments, an ANC system e.g., ANC system 100 (FIG. 1), may include a first array 219 of one or more primary sensors, e.g., microphones, accelerometers, tachometers and the like, configured to sense the primary patterns at one or more of locations 105. For example, array 219 may include a plurality of acoustic sensors 119 (FIG. 1). For example, array 219 may include a microphone to output a noise signal 104 (FIG. 1) including, for example, a sequence of N samples per second. For example, N may be 48000 samples per second, e.g., if the microphone operates at a sampling rate of about 48 KHz.

The noise signal 104 (FIG. 1) may include any other suitable signal having any other suitable sampling rate and/or any other suitable attributes.

In some demonstrative embodiments, at least some of the primary sensors 219, e.g., acoustic sensors 119 (FIG. 1), may be configured to sense the primary patterns at the plurality of HVAC noise sensing locations, which are defined with respect to one or more components of the HVAC system 120 (FIG. 1), e.g., as described below.

In some demonstrative embodiments, one or more of the sensors of array 219 may be implemented using one or more "virtual sensors". For example, array 219 may be implemented by a combination of at least one microphone and at least one virtual microphone. A virtual microphone corresponding to a particular microphone location of locations 105 may be implemented by any suitable algorithm and/or method, e.g., as part of controller 102 (FIG. 1) or any other element of system 100 (FIG. 1), capable of evaluating an acoustic pattern, which would have be sensed by an acoustic sensor located at the particular microphone location. For example, controller 102 (FIG. 1) may be configured to evaluate the acoustic pattern of the virtual microphone based on at least one actual acoustic pattern sensed by the at least one microphone 119 (FIG. 1) of array 219.

In some demonstrative embodiments, ANC system 100 (FIG. 1) may include a second array 221 of one or more error sensors, e.g., microphones, configured to sense the acoustic residual-noise at one or more of locations 107. For example, array 221 may include a plurality of acoustic sensors 121 (FIG. 1). For example, the error sensors may include one or more sensors to sense the acoustic residual-noise patterns on a spherical surface within spherical sound control zone 110.

In some demonstrative embodiments, one or more of the sensors of array 221 may be implemented using one or more "virtual sensors". For example, array 221 may include a combination of at least one microphone and at least one virtual microphone. A virtual microphone corresponding to a particular microphone location of locations 107 may be implemented by any suitable algorithm and/or method, e.g., as part of controller 102 (FIG. 1) or any other element of system 100 (FIG. 1), capable of evaluating an acoustic pattern, which would have be sensed by an acoustic sensor located at the particular microphone location. For example, controller 102 (FIG. 1) may be configured to evaluate the acoustic pattern of the virtual microphone based on at least one actual acoustic pattern sensed by the at least one microphone 121 (FIG. 1) of array 221.

In some demonstrative embodiments, the number, location and/or distribution of the locations 105 and/or 107, and/or the number, location and/or distribution of one or more acoustic sensors at one or more of locations 105 and 107 may be determined based on a size of sound control zone 110 or of an envelope of sound control zone 110, a shape of sound control zone 110 or of the envelope of sound control zone 110, one or more attributes of the acoustic sensors to be located at one or more of locations 105 and/or 107, e.g., a sampling rate of the sensors, and the like.

In one example, one or more acoustic sensors, e.g., microphones, accelerometers, tachometers and the like, may be deployed at locations 105 and/or 107 according to the Spatial Sampling Theorem, e.g., as defined below by Equation 1.

For example, a number of the primary sensors, a distance between the primary sensors, a number of the error sensors and/or a distance between the error sensors may be determined in accordance with the Spatial Sampling Theorem, e.g., as defined below by Equation 1.

In one example, the primary sensors and/or the error sensors may be distributed, e.g., equally or non-equally distributed, with a distance, denoted d, from one another. For example, the distance d may be determined as follows:

$$d \leq c/2 \cdot f \quad (1)$$

wherein c denotes the speed of sound and $f_{max}$ denotes a maximal frequency at which sound control is desired.

For example, in maximal frequency of interest is $f_{max}=100$ [Hz], the distance d may be determined as $d \leq 343/2 \cdot 100 = 1.71$ [m].

As shown in FIG. 2 deployment scheme 200 is configured with respect to a circular or spherical sound control zone 110. For example, one or more locations 105 are distributed, e.g., substantially evenly distributed, in a spherical or circular manner around sound control zone 110, and locations 107 are distributed, e.g., substantially evenly distributed, in a spherical or circular manner within sound control zone 110.

However in other embodiments, components of ANC system 100 (FIG. 1) may be deployed according to any other deployment scheme including any suitable distribution of locations 105 and/or 107, e.g., configured with respect a sound control zone of any other suitable form and/or shape.

In some demonstrative embodiments, controller 102 (FIG. 1) may be configured to determine the sound control pattern to be reduced according to at least one noise parameter, e.g., energy, amplitude, phase, frequency, direction, and/or statistical properties within sound control zone 110, e.g., as described in detail below.

In some demonstrative embodiments, controller 102 (FIG. 1) may determine the sound control pattern to selectively reduce one or more predefined first noise patterns within sound control zone 110, while not reducing one or more second noise patterns within sound control zone 110, e.g., as described below.

In some demonstrative embodiment, sound control zone 110 may be located within an interior of a vehicle, and controller 102 (FIG. 1) may determine the sound control pattern to selectively reduce one or more first noise patterns, e.g., including a road noise pattern, a wind noise pattern, and/or an engine noise pattern, while not reducing one or more second noise patterns, e.g., including an audio noise pattern of an audio device located within the vehicle, a horn noise pattern, a siren noise pattern, a hazard noise pattern of a hazard, an alarm noise pattern of an alarm signal, a noise pattern of an informational signal, and the like.

In some demonstrative embodiments, controller 102 (FIG. 1) may determine the sound control pattern without having information relating to one or more noise-source attributes of one or more of actual noise sources 202 generating the acoustic noise at the noise sensing locations 105.

For example, the noise-source attributes may include a number of noise sources 202, a location of noise sources 202, a type of noise sources 202 and/or one or more attributes of one or more noise patterns generated by one or more of noise sources 202.

Referring back to FIG. 1, in some demonstrative embodiments, controller 193 may be configured to determine the sound control pattern for sound control signal 109 based on the HVAC input 129, e.g., as described below.

In some demonstrative embodiments, one or more sensors of ANC system 100 may be located at one or more points inside HVAC system 120, e.g., near the blower and/or fan, near the compressor, inside the air ducts, and/or near the vent outlets, for example, to enable ANC system 100 to efficiently reduce or even cancel the noise produced by HVAC system 120, e.g., as described below.

In some demonstrative embodiments, reducing the noise created by HVAC system 120, e.g., by ANC system 100, may create an improved user experience of the user of the vehicle, may reduce health hazards, and/or may enhance driver attention, e.g., by reducing a cognitive overload caused by the noise.

In some demonstrative embodiments, reducing the noise created by HVAC system 120, e.g., by ANC system 100, may allow, for example, an improved voice recognition, improved speech, and/or an improved In Car Communication (ICC) between users of the vehicle.

In some demonstrative embodiments, ANC system 100 may be configured to receive and process the HVAC input 129 from HVAC system 120, for example, via input 191, e.g., as described below.

In some demonstrative embodiments, HVAC input 129 may include HVAC configuration information of HVAC system 120, e.g., as described below.

In some demonstrative embodiments, the HVAC configuration information may include a mode of operation of HVAC system 120. For example, the HVAC configuration information may indicate heating, cooling, defrosting, e.g., rear or front window, dry mode, defogging, fan mode, and the like. In another example, the HVAC configuration information may include any other additional or alternative mode of operation.

In some demonstrative embodiments, the HVAC configuration information may include a fan mode of one or more fans of HVAC system 120. For example, the HVAC configuration information may include a turbo mode, a quiet mode, a speed, or level of speed of one or more fans, and/or the like. In another example, the HVAC configuration information may include any other additional or alternative fan parameters.

In some demonstrative embodiments, the HVAC configuration information may include climate parameters. For example, the HVAC configuration information may include a temperature, a humidity level, and/or the like. In another example, the HVAC configuration information may include any other additional or alternative climate parameters.

In other embodiments, the HVAC configuration information may include any other additional or alternative parameter, attribute, or metrics of the HVAC system 120.

In some demonstrative embodiments, controller 193 may be configured to determine the sound control signal 109, for example, based on HVAC input 129, for example, in addition to noise inputs 104 and residual-noise inputs 106, e.g., as described below.

In some demonstrative embodiments, controller 193 may be configured to output sound control signal 109 to control acoustic transducer 108, for example, to reduce or cancel the noise produced by HVAC system 120, e.g., as described below.

In some demonstrative embodiments, controller 193 may determine sound control signal 109, for example, by applying an estimation function or prediction function on noise inputs 104 and/or residual-noise inputs 106, e.g., as described below.

In some demonstrative embodiments, controller 193 may include an estimator (also referred to as a "prediction unit") configured to apply the estimation or prediction function to noise inputs 104 and/or residual-noise inputs 106, e.g., as described below.

In some demonstrative embodiments, controller 193 may be configured to cause the estimator or prediction unit to utilize one or more prediction parameters, e.g., for the estimation function, for example, based on the HVAC input 129, e.g., as described below.

In one example, controller 193 may be configured to determine a first set of prediction parameters for a first HVAC configuration of HVAC system 120. For example, the first HVAC configuration may include heating, and maximal fan speed.

In another example, controller 193 may be configured to determine a second set of prediction parameters for a second HVAC configuration of HVAC system 120. For example, the second HVAC configuration may include defogging front window, and minimal fan speed.

In some demonstrative embodiments, HVAC system 120 may have several modes of operation, for example, cooling, heating, ventilation, defrost, defog, and the like. For example, a mode of operation, e.g., each mode of operation, may have its own noise profile and/or spectrum. According to this example, one or more filters, e.g., one or more specific filters, may be calculated and used for each operation mode separately, for example, in order to obtain a maximal noise cancellation for all operation modes.

In some demonstrative embodiments, for a mode, e.g., for each mode, there may be several fan speeds. For example, each fan speed may produce different noise. Accordingly, controller 193 may be configured to determine the one or more filters, for example, to optimize active noise cancellation for the different fan speeds.

In some demonstrative embodiments, controller 193 may be configured to update or change the sound control signal 109, for example, when the HVAC configuration information is changed, e.g., as described below.

For example, controller 193 may be configured to update or change the sound control signal 109, for example, based on a detected change of the HVAC configuration, for example, when the user changes the HVAC configuration and/or when the HVAC configuration is automatically changes by one or more components of the HVAC system 120 and/or by another system of the vehicle.

In one example, ANC controller 102 may be configured to change between corresponding filters according to the HVAC configuration information, e.g., received via HVAC input 129, for example, when the HVAC system 120 shifts between the operation modes, e.g., during vehicle operation.

In some demonstrative embodiments, controller 193 may determine one or more prediction parameters for an HVAC configuration, for example, based on a Look Up Table (LUT), e.g., as described below.

In some demonstrative embodiments LUT may be configured to map a plurality of HVAC configurations and a plurality of settings for the prediction parameters, In one example, the LU maybe configured to match between first prediction parameters and first HVAC configuration, and/or the LUT may match between second prediction parameters, e.g., different from the first prediction parameters, and a second HVAC configuration, e.g., different from the first HVAC configuration.

In some demonstrative embodiments, controller 193 may determine the one or more prediction parameters for the HVAC configuration, for example, based on any other additional or alternative algorithm, method, function, and/or procedure.

In some demonstrative embodiments, the prediction parameters may include weights, coefficients, functions, and/or any other additional or alternative parameter to be utilized for determining the sound control pattern, e.g., as described below.

In some demonstrative embodiments, the prediction parameters may include one or more path transfer function parameters of the estimation or prediction function, e.g., as described below. In one example, the prediction parameters may include one or more STFs to be applied by controller 193 for determining the sound control pattern. The STFs may include a representation of acoustic paths from one or more of the acoustic transducers 108 to one or more of the noise sensing locations 105.

In some demonstrative embodiments, the prediction parameters may include one or more update rate parameters corresponding to an updating rate of the weighs of the estimation or prediction function, e.g., as described below.

In other embodiments, the prediction parameters may include any other additional or alternative parameters.

In some demonstrative embodiments, controller 193 may be configured to determine, set, adapt and/or update one or more of the STFs based on changes in the HVAC configuration indicated by the HVAC input 129, e.g., as described below.

In some demonstrative embodiments, controller 193 may be configured to determine, set, adapt and/or update one or more of the prediction parameters based on changes in the HVAC configuration indicated by the HVAC input 129, e.g., as described below.

In one example, controller 193 may be configured to detect a change in a temperature setting of the HVAC system 120 based on HVAC input 129, and, based on the detected change, to selectively increase/decrease one or more Speaker Transfer Function (STF) coefficients; to change frequency bands of the STF and/or PF, for example, to change a frequency band of adaptation to a targeted HVAC scenario; to modify an adaptation rate, and/or to modify one or more other settings and/or parameters for generating the sound control signal 109.

In another example, controller 193 may be configured to detect a change in a re-circulation or outside-air mode of the HVAC system 120 based on HVAC input 129, and, based on the detected change, to selectively increase/decrease one or more STF coefficients; to change frequency bands of the STF and/or PF, for example, to change a frequency band of adaptation to a targeted HVAC scenario; to modify an adaptation rate; and/or to modify one or more other settings and/or parameters for generating the sound control signal 109.

In another example, controller 193 may be configured to detect a change in a blower speed of the HVAC system 120 based on HVAC input 129, and, based on the detected change, to selectively increase/decrease one or more STF coefficients; to change frequency bands of the STF and/or PF, for example, to change a frequency band of adaptation to a targeted HVAC scenario; to modify an adaptation rate; and/or to modify one or more other settings and/or parameters for generating the sound control signal 109.

In some demonstrative embodiments, controller 193 may be configured to extract from the plurality of noise inputs 104 a plurality of disjoint reference acoustic patterns, which are statistically independent.

For example, controller 193 may include an extractor to extract the plurality of disjoint reference acoustic patterns.

The phrase "disjoint acoustic patterns" as used herein may refer to a plurality of acoustic patterns, which are independent with respect to at least one feature and/or attribute, e.g., energy, amplitude, phase, frequency, direction, one or more statistical signal properties, and the like.

In some demonstrative embodiments, controller 193 may extract the plurality of disjoint reference acoustic patterns by applying a predefined extraction function to the plurality of noise inputs 104.

In some demonstrative embodiments, the extraction of the disjoint acoustic patterns may be used, for example, to model the primary pattern of inputs 104 as a combination of the predefined number of disjoint acoustic patterns, e.g., corresponding to a respective number of disjoint modeled acoustic sources.

In one example, it may be expected that one or more expected noise patterns, which are expected to affect sound control zone 110, may be generated by one or more of road noise, wind noise, engine noise and the like. Accordingly, controller 193 may be configured to select one or more reference acoustic patterns based on one or more attributes of the road noise pattern, the wind noise pattern, and/or the engine noise pattern.

Figure 3:
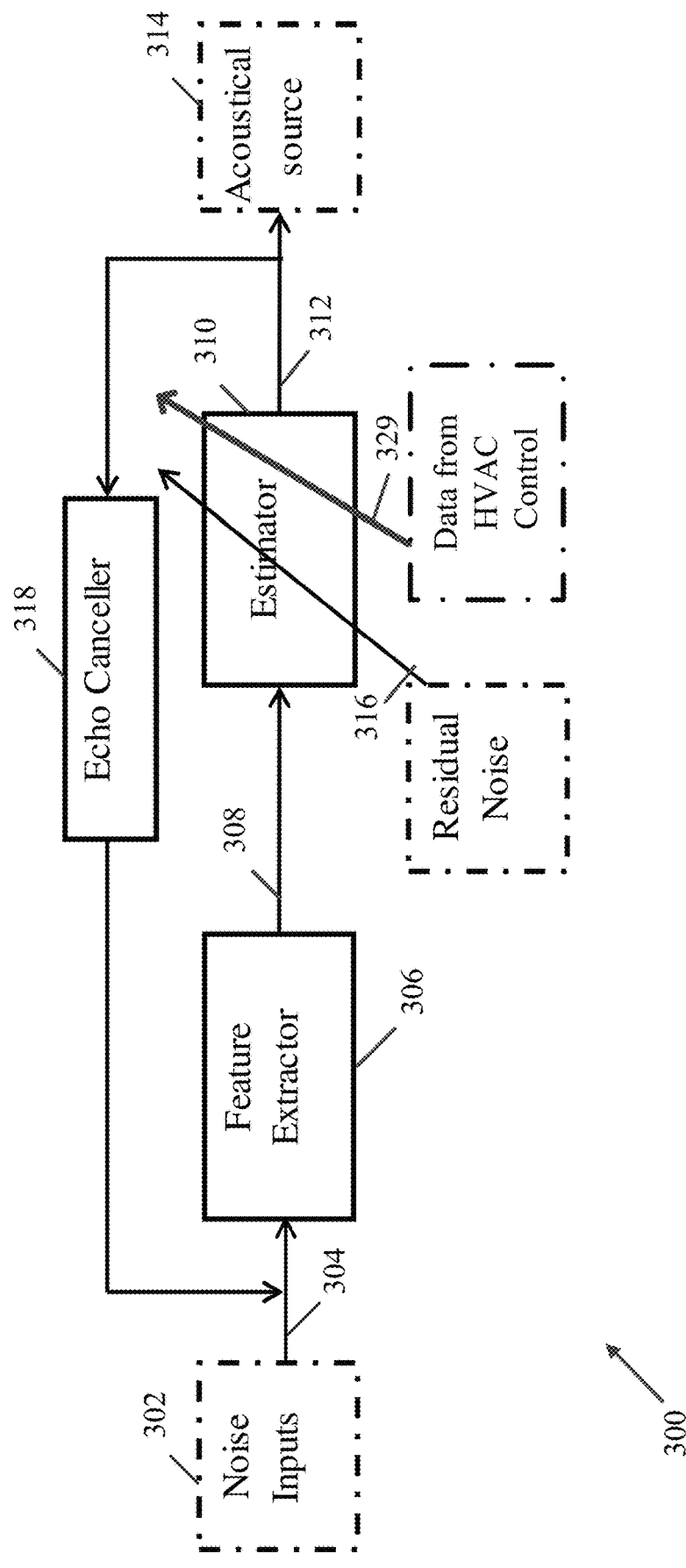
FIG. 3 is a schematic block diagram illustration of a controller, in accordance with some demonstrative embodiments.

Reference is now made to FIG. 3, which schematically illustrates a controller 300, in accordance with some demonstrative embodiments. In some embodiments, ANC controller 102 (FIG. 1) and/or controller 193 (FIG. 1) may perform, for example, one or more functionalities and/or operations of controller 300.

In some demonstrative embodiments, controller 300 may receive an HVAC input 329, e.g., including the HVAC configuration information of HVAC system 120 (FIG. 1).

In some demonstrative embodiments, controller 300 may receive a plurality of inputs 304, e.g., including inputs 104 (FIG. 1), representing acoustic noise at a plurality of predefined noise sensing locations, e.g., locations 105 (FIG. 2). Controller 300 may generate a sound control signal 312 to control at least one acoustic transducer 314, e.g., acoustic transducer 108 (FIG. 1).

In some demonstrative embodiments, controller 300 may include an estimator ("prediction unit") 310 to estimate signal 312 by applying an estimation function to an input 308 corresponding to inputs 304.

In some demonstrative embodiments, estimator 310 may estimate signal 312, for example, based on HVAC input 329, e.g., as described below.

In some demonstrative embodiments, e.g., as shown in FIG. 3, controller 300 may include an extractor 306 to extract a plurality of disjoint reference acoustic patterns from inputs 304. According to these embodiments, input 308 may include the plurality of disjoint reference acoustic patterns.

In some demonstrative embodiments, controller 300 may generate signal 312 configured to reduce and/or eliminate the noise produced by HVAC system 120.

In some demonstrative embodiments, controller 300 may generate sound control signal 312 configured to reduce and/or eliminate the noise energy and/or wave amplitude of one or more sound patterns within the sound control zone, while the noise energy and/or wave amplitude of one or more other sound patterns may not be affected within the sound control zone.

In some demonstrative embodiments, sound control signal 312 may be configured to reduce and/or eliminate the noise produced by HVAC system 120 (FIG. 1).

In other embodiments, controller 300 may not include extractor 306. Accordingly, input 308 may include inputs 304 and/or any other input based on inputs 304.

In some demonstrative embodiments, estimator 310 may apply any suitable linear and/or non-linear function to input 308. For example, the estimation function may include a non-linear estimation function, e.g., a radial basis function.

In some demonstrative embodiments, estimator 310 may be able to adapt one or more parameters of the estimation function based on a plurality of residual-noise inputs 316 representing acoustic residual-noise at a plurality of predefined residual-noise sensing locations, which are located within the noise-control zone. For example, inputs 316 may include inputs 106 (FIG. 1) representing acoustic residual-noise at residual-noise sensing locations 107 (FIG. 2), which are located within noise-control zone 110 (FIG. 2).

In some demonstrative embodiments, one or more of inputs 316 may include at least one virtual microphone input corresponding to a residual noise ("noise error") sensed by at least one virtual error sensor at least one particular residual-noise sensor location of locations 107 (FIG. 2). For example, controller 300 may evaluate the noise error at the particular residual-noise sensor location based on inputs 308 and the predicted noise signal 312, e.g., as described below.

In some demonstrative embodiments, estimator 310 may include a multi-input-multi-output (MIMO) prediction unit configured, for example, to generate a plurality of sound control patterns corresponding to the n-th sample, e.g., including M control patterns, denoted $y_1(n) \ldots y_M(n)$, to drive a plurality of M respective acoustic transducers, e.g., based on the inputs 308.

Figure 4:
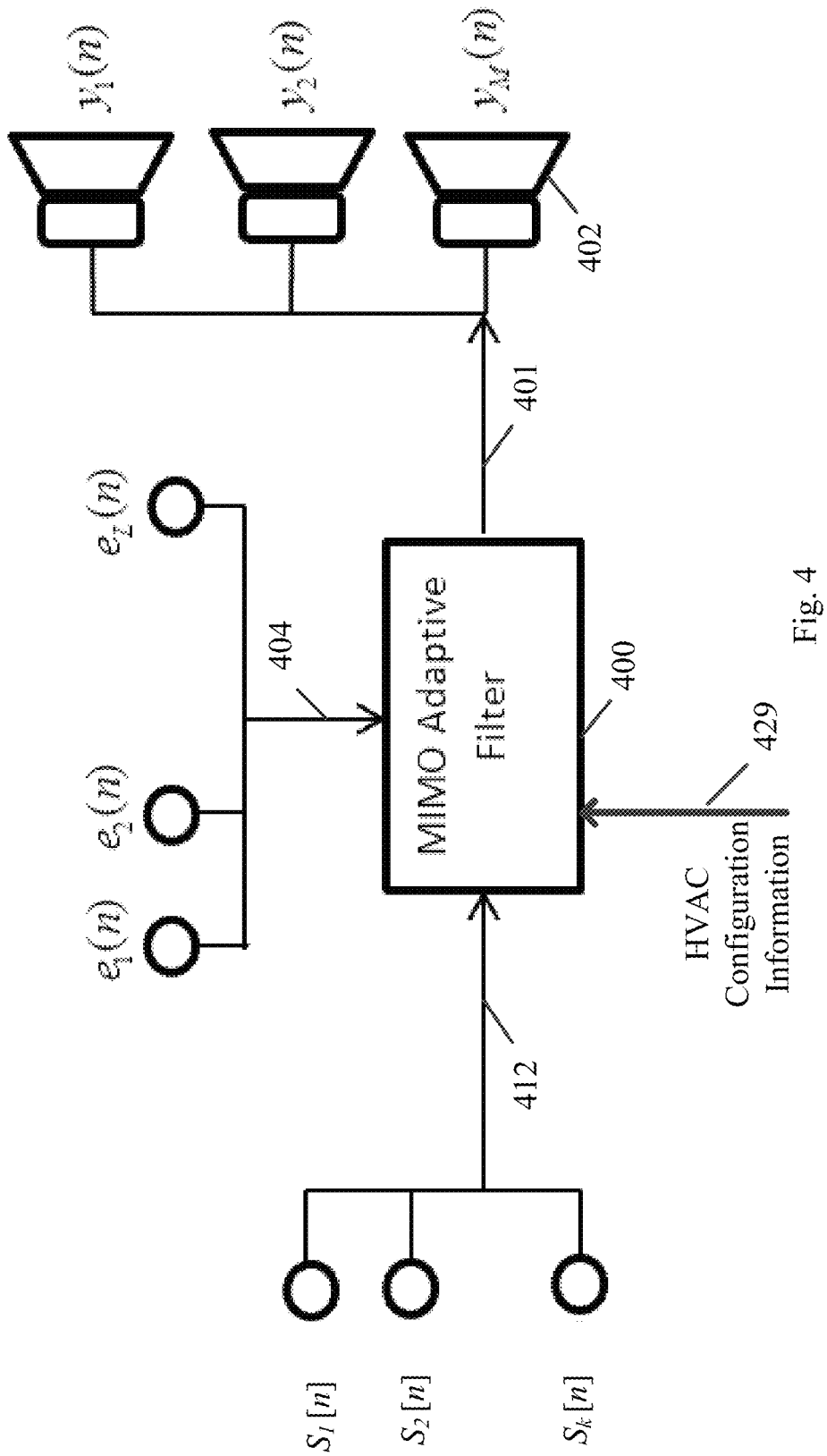
FIG. 4 is a schematic block diagram illustration of a Multiple-Input-Multiple-Output (MIMO) prediction unit, in accordance with some demonstrative embodiments.

Reference is now made to FIG. 4, which schematically illustrates a MIMO prediction unit 400, in accordance with some demonstrative embodiments. In some demonstrative embodiments, estimator 310 (FIG. 3) may include MIMO prediction unit 400, and/or perform one or more functionalities of, and/or operations of, MIMO prediction unit 400.

As shown in FIG. 4, prediction unit 400 may be configured to receive an HVAC input 429 including the HVAC configuration information from HVAC system 120 (FIG. 1).

As shown in FIG. 4, prediction unit 400 may be configured to receive an input 412 including the vector e.g., as output from extractor 306 (FIG. 3), and to drive a loudspeaker array 402 including M acoustic transducers, e.g., acoustic transducers 108 (FIG. 2). For example, prediction unit 400 may generate a controller output 401 including the M sound control patterns $y_1(n) \ldots y_M(n)$, to drive a plurality of M respective acoustic transducers, e.g., acoustic transducers 108 (FIG. 2), for example, based on the inputs 308.

In some demonstrative embodiments, interference (crosstalk) between two or more of the M acoustic transducers of array 402 may occur, for example, when two or more, e.g., all of, the M acoustic transducers generate the control noise pattern, e.g., simultaneously.

In some demonstrative embodiments, prediction unit 400 may generate output 401 configured to control array 402 to generate a substantially optimal sound control pattern, e.g., while simultaneously optimizing the input signals to each speaker in array 402. For example, prediction unit 400 may control the multi-channel speakers of array 402, e.g., while cancelling the interface between the speakers.

In one example, prediction unit 400 may utilize a linear function with memory. For example, prediction unit 400 may determine a sound control pattern, denoted $y_m[n]$, corresponding to an m-th speaker of array 402 with respect to the n-th sample of the primary pattern, e.g., as follows:

$$y_m[n] = \sum_{k=1}^{K}\sum_{i=1}^{I-1} w_{km}[i]s_k[n-i] \quad (2)$$

wherein $s_k[n]$ denotes the k-th disjoint reference acoustic pattern, e.g., received from extractor 306 (FIG. 3), and $w_{km}[i]$ denotes a prediction filter coefficient configured to drive the m-th speaker based on the k-th disjoint reference acoustic pattern, e.g., as described below.

In another example, prediction unit 400 may implement any other suitable prediction algorithm, e.g., linear, or non-linear, having or not having memory, and the like, to determine the output 401.

In some demonstrative embodiments, prediction unit 400 may optimize the prediction filter coefficients $w_{km}[i]$, for example, based on a plurality of a plurality of residual-noise inputs 404, e.g., including a plurality of residual-noise inputs 316. For example, prediction unit 400 may optimize the prediction filter coefficients $w_{km}[i]$, for example, to achieve maximal destructive interference at the residual-error sensing $e_1[n], e_2[n], \ldots, e_L[n]$ locations 107 (FIG. 2). For example, locations 107 may include L locations, and inputs 404 may include L residual noise components, denoted $e_1[n], e_2[n], \ldots, e_L[n]$.

In some demonstrative embodiments, prediction unit 400 may optimize one or more of, e.g., some or all of, the prediction filter coefficients $w_{km}[i]$ based, for example, on a minimum mean square error (MMSE) criterion, or any other suitable criteria. For example, a cost function, denoted J, for optimization of one or more, of, e.g., some or all of, the prediction filter coefficients $w_{km}[i]$ may be defined, for example, as a total energy of the residual noise components $e_1[n], e_2[n], \ldots, e_L[n]$ at locations 107 (FIG. 2), e.g., as follows:

$$J = E\left\{\sum_{l=1}^{L} e_l^2[n]\right\} \quad (3)$$

In some demonstrative embodiments, a residual noise pattern, denoted $e_l[n]$, at an l-th location may be expressed, for example, as follows:

$$e_l[n] = d_l[n] - \sum_{m=1}^{M}\sum_{j=0}^{J-1} stf_{lm}[j] \cdot y_m[n-j] = \quad (4)$$

$$d_l[n] - \sum_{m=1}^{M}\sum_{j=0}^{J-1} stf_{lmj}[j] \cdot \sum_{k=1}^{K}\sum_{i=1}^{I-1} w_{km}[i]s_k[n-i]$$

wherein $stf_{lm}[j]$ denotes a path transfer function having J coefficients from the m-th speaker of the array 402 at a l-th location; and $w_{km}[n]$ denotes an adaptive weight vector of the prediction filter with I coefficients representing the relationship between the k-th reference acoustic pattern $s_k[n]$ and the control signal of the m-th speaker. In some demonstrative embodiments, prediction unit 400 may optimize one or more elements of, e.g., some or all elements of, the adaptive weights vector $w_{km}[n]$, e.g., to reach an optimal point, e.g., a maximal noise reduction, e.g., of the noise produced by HVAC system 120 (FIG. 1). For example, prediction unit 400 may implement a gradient based adaption method, when at each step the weight vector $w_{km}[n]$ is updated in a negative direction of a gradient of the cost function J, e.g., as follows:

$$W_{km}[n+1] = w_{km}[n] - \frac{\mu_{km}}{2} \cdot \nabla J_{km} \quad (5)$$

-continued $$\nabla J_{km} = -2\sum_{l=1}^{L} e_l[n]\sum_{i=1}^{I-1} stf_{km}[n]x_k[n-i]$$

$$w_{km}[n+1] = w_{km}[n] + \mu_{km} \cdot \sum_{l=1}^{L} e_l[n]\sum_{i=1}^{I-1} stf_{km}[n]x_k[n-i]$$

Referring back to FIG. 1, in some demonstrative embodiments, controller 193 may be configured to update one or more parameters of Equations 3, 4 and/or 5, for example, based on HVAC input 129, e.g., as described below.

In other embodiments, controller 193 (FIG. 1) may be configured to update one or more other additional or alternative parameters for prediction unit 400 (FIG. 4) and/or estimator 310 (FIG. 3).

In some demonstrative embodiments, controller 193 may be configured to update the one or more parameters of Equations 3, 4 and/or 5, for example, based on HVAC input 129, for example, to generate controller output 401 (FIG. 4), which may be configured to reduce or cancel the noise produces by HVAC system 120.

In some demonstrative embodiments, controller 193 may update one or more path transfer functions $stf_{lm}[j]$ in Equations 4 and/or 5, for example, based on HVAC input 129.

In some demonstrative embodiments, controller 193 may update one or more of the update rate parameters $\mu_{km}$ in Equation 5, for example, based on HVAC input 129.

In one example, controller 193 may be configured to use one or more update rate parameters $\mu_{km}$, for example, some or all of, the update rate parameters $\mu_{km}$. For example, a set of update rate parameters $\mu_{km}$ may be determined or preconfigured based on the HVAC input 129, for example, based on the mode of operation of HVAC system 120 and/or one or more parameters of the mode of operation of HVAC system 120, e.g., as described above.

Figure 5:
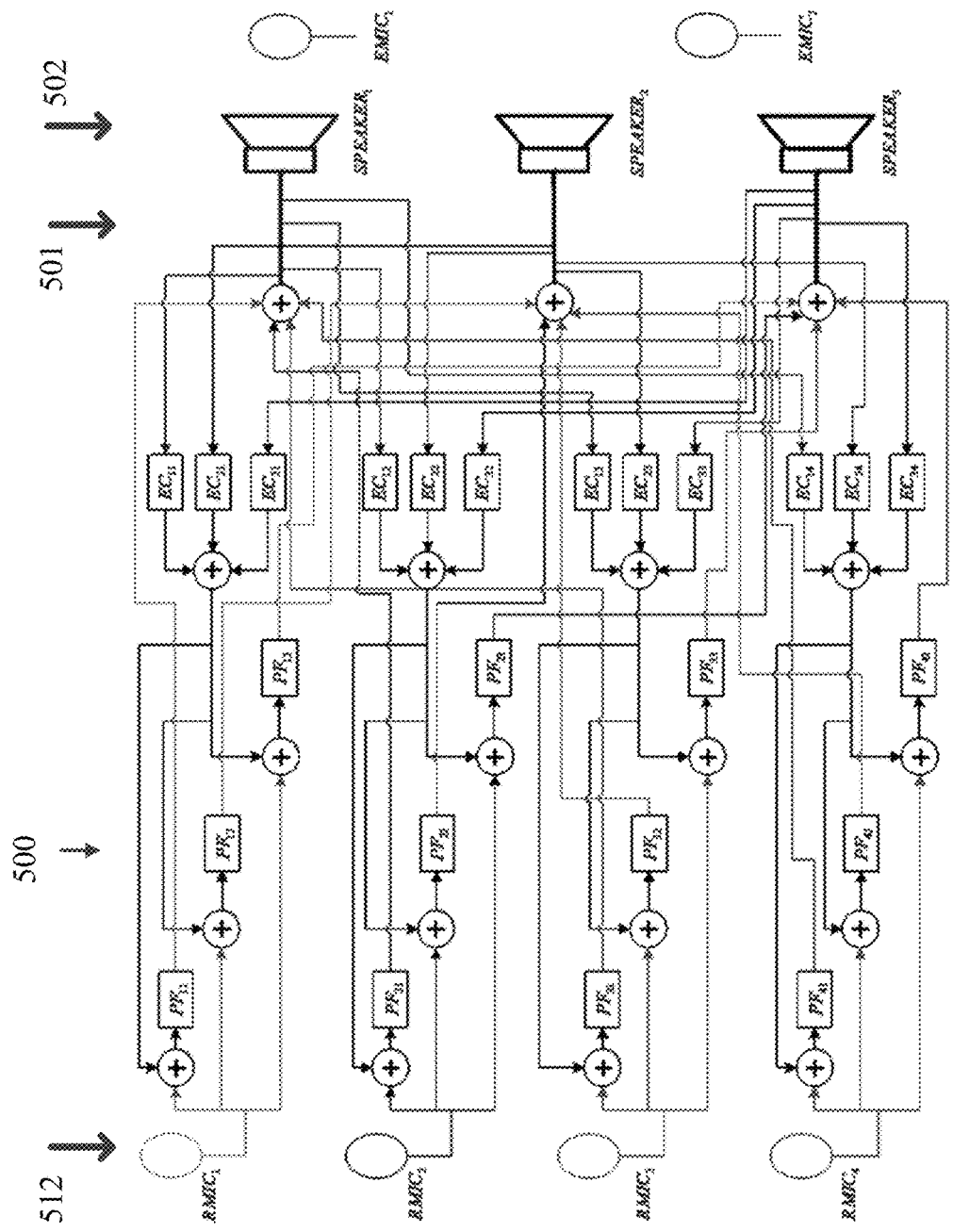
FIG. 5 is a schematic illustration of an implementation of components of a controller of an ANC system, in accordance with some demonstrative embodiments.

Reference is made to FIG. 5, which schematically illustrates an implementation of a controller 500 in an ANC system, in accordance with some demonstrative embodiments. For example, controller 193 (FIG. 1), controller 300 (FIG. 3) and/or prediction unit 400 (FIG. 4) may include one or more elements of controller 500 (FIG. 5) and/or may perform one or more operations and/or functionalities of controller 500.

In some demonstrative embodiments, controller 500 may be configured to receive inputs 512 including residual noise from a plurality of Microphones (RMIC), and to generate output signals 501 to drive a speaker array 502 including M acoustic transducers, e.g., three speakers or any other number of speakers. For example, the inputs 512 may include inputs 106 (FIG. 1), inputs 316 (FIG. 3) and/or inputs 404 (FIG. 4).

In some demonstrative embodiments, controller 500 may be configured to configure, determine, update and/or set one or parameters of Prediction Filters, denoted PF, for example, based on HVAC input 129 (FIG. 1), e.g., as described above.

Referring back to FIG. 1, in some demonstrative embodiments, sensors of ANC system 100 may be located within one or more predefined location in a vehicle.

In some demonstrative embodiments, determining a location of sensors, e.g., reference microphones, inside and/or near components of the HVAC system 120 may support a technical advantage of improved and/or efficient active noise reduction, for example, to achieve an optimal performance of ANC system 100, e.g., as described below.

Figure 6:
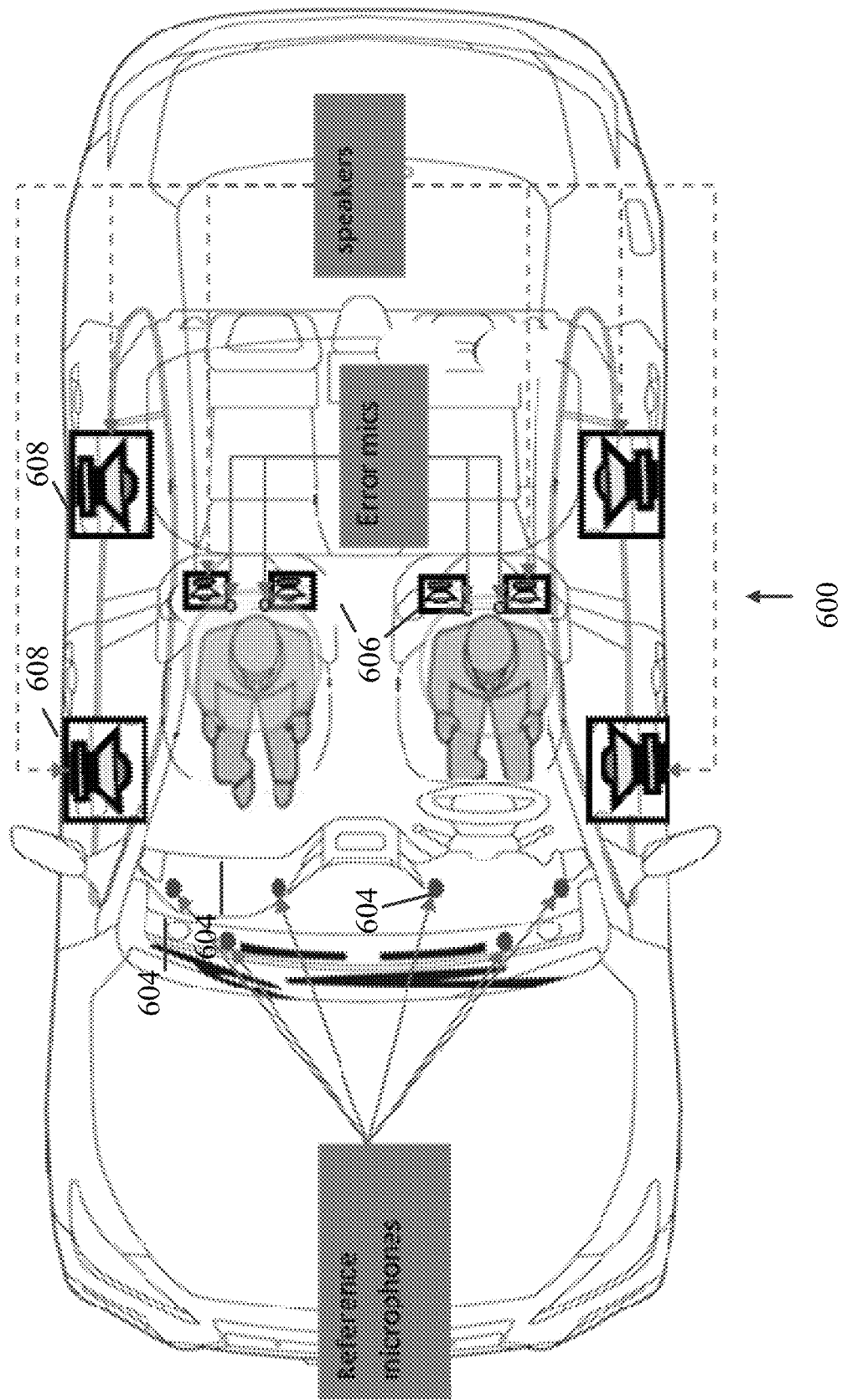
FIG. 6 is a schematic block diagram illustration of a deployment of components of an ANC system in a vehicle, in accordance with some demonstrative embodiments.

Reference is made to FIG. 6, which schematically illustrates a deployment of components of an ANC system 600 in a vehicle, in accordance with some demonstrative embodiments.

As shown in FIG. 6, ANC system 600 may include a plurality of speakers 608, a plurality of reference microphones 604, and a plurality of error microphones 606. For example, ANC controller 102 (FIG. 1) may be configured to receive inputs 104 (FIG. 1) from reference microphones 604, to receive inputs 106 (FIG. 1) from error microphones 606, and/or to generate sound control signal 109 (FIG. 1) to be provided to speakers 608.

As shown in FIG. 6, the plurality of reference microphones 604 may be located within and/or in proximity to components of the HVAC system 120 (FIG. 1).

In other embodiments, the deployment of ANC system 600 within the vehicle may include any other number of the plurality of speakers 608, the plurality of reference microphones 604, and/or the plurality of error microphones 606, any other arrangement, positions and/or locations of the plurality of speakers 608, the plurality of reference microphones 604, and/or the plurality of error microphones 606, and/or any other deployment of any other additional or alternative components.

Figure 7:
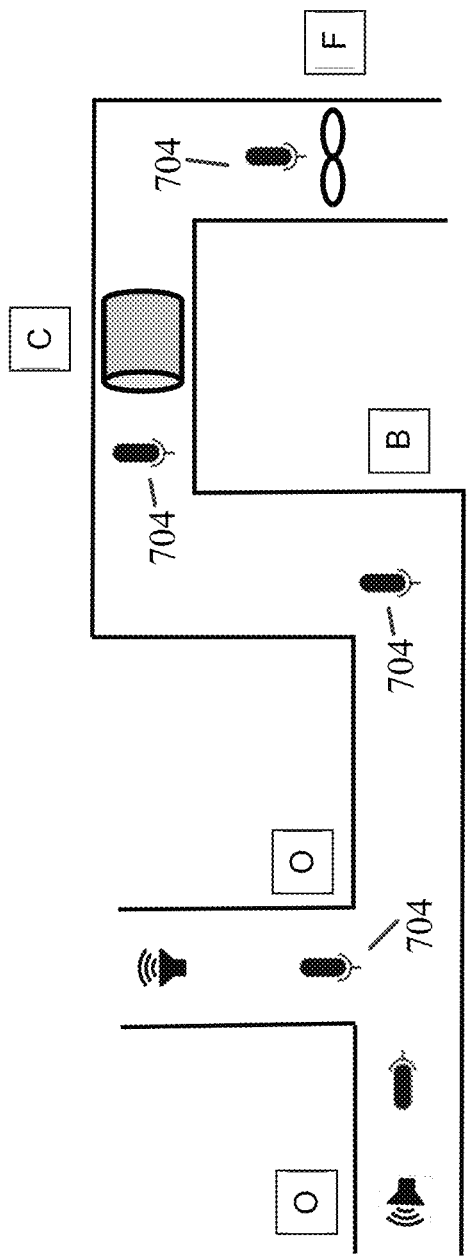
FIG. 7 is a schematic block diagram illustration of possible locations of sensors of an ANC system, in accordance with some demonstrative embodiments.

Reference is made to FIG. 7, which schematically illustrates possible locations of sensors of an ANC system, e.g., in accordance with some demonstrative embodiments.

In some demonstrative embodiments, as shown in FIG. 7, one or more reference microphones 704 may be located within air ducts of an HVAC system, e.g., HVAC system 120 (FIG. 1), for example, in one or more possible locations. For example, controller 193 (FIG. 1) may receive inputs 104 (FIG. 1) from one or more of the reference microphones 704.

In one example, as shown in FIG. 1, the one or more reference microphones 704 may be located in proximity to a blower or a fan, denoted (F), of the HVAC system 120 (FIG. 1).

In one example, as shown in FIG. 1, the one or more reference microphones 704 may be located in proximity to a compressor, denoted (C), of the HVAC system 120 (FIG. 1).

In one example, as shown in FIG. 1, the one or more reference microphones 704 may be located in proximity to one or more curves or bends, e.g., in proximity to a middle of a curve or a bend and/or right after a curve or a bend, denoted (B), in the air ducts of the HVAC system 120 (FIG. 1).

In one example, as shown in FIG. 1, the one or more reference microphones 704 may be located in proximity to one or more air outlets, denoted (O), of the HVAC system 120 (FIG. 1).

In other embodiments, any other additional or alternative locations within the air ducts of an HVAC system 120 (FIG. 1) and/or in proximity to any other components of the HVAC system 120 (FIG. 1) may be implemented.

Figure 8:
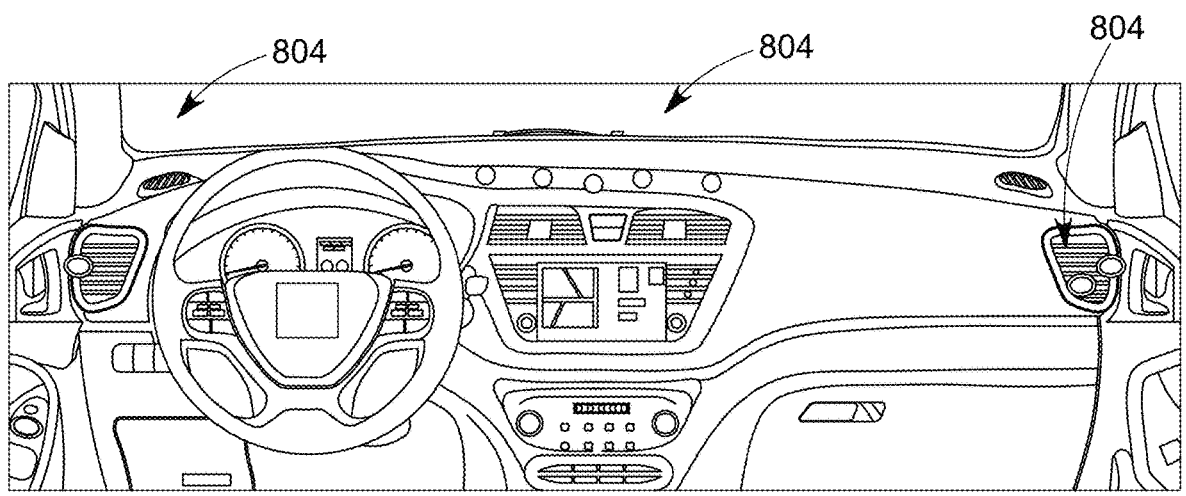
FIG. 8 is an illustration of possible locations of sensors of an ANC system, in accordance with some demonstrative embodiments.

Reference is made to FIG. 8, which schematically illustrates possible locations of sensors of an ANC system, e.g., in accordance with some demonstrative embodiments.

In some demonstrative embodiments, as shown in FIG. 8, one or more reference microphones 804 may be located in proximity to outlets of the air ducts of an HVAC system of a vehicle, e.g., under a dashboard of the vehicle. For example, controller 193 (FIG. 1) may receive inputs 104 (FIG. 1) from one or more of the reference microphones 804, which may be located in proximity to outlets of the air ducts of HVAC system 120 (FIG. 1).

In other embodiments, any other additional or alternative sensor locations may be implemented.

Figure 9:
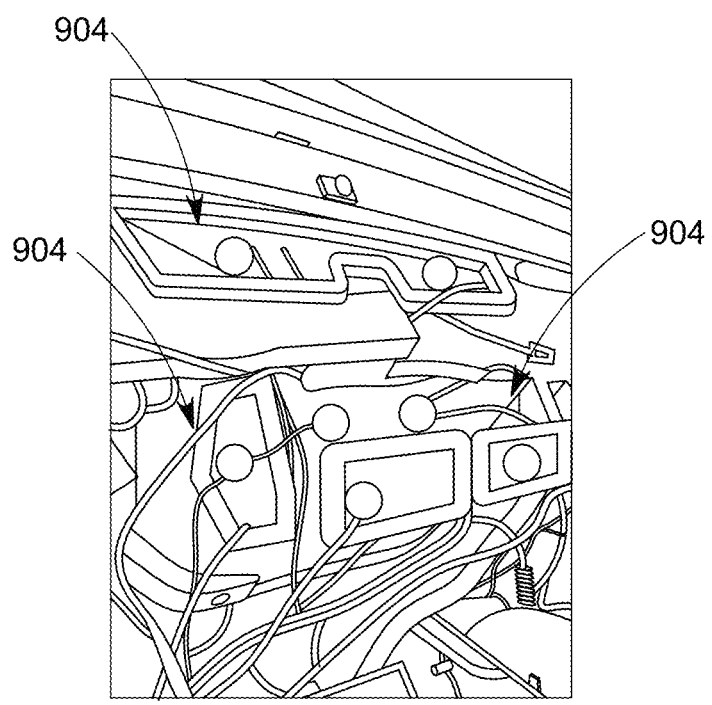
FIG. 9 is an illustration of possible locations of sensors of an ANC system, in accordance with some demonstrative embodiments.

Reference is made to FIG. 9, which schematically illustrates possible locations of sensors of an ANC system, e.g., in accordance with some demonstrative embodiments.

In some demonstrative embodiments, as shown in FIG. 9, one or more reference microphones 904 may be located in proximity to outlets of air ducts of an HVAC system of a vehicle, e.g., under a dashboard of the vehicle. For example, controller 193 (FIG. 1) may receive inputs 104 (FIG. 1) from one or more of the reference microphones 904, which may be located in proximity to outlets of the air ducts of HVAC system 120 (FIG. 1).

In other embodiments, any other additional or alternative locations may be implemented.

Referring back to FIG. 1, in some demonstrative embodiments, analysis may be performed with respect to an influence of positions of reference microphones and air velocity, e.g., within ducts of the HVAC system 120 and/or from air outlets of the HVAC system, on the coherence between the inputs 104 from reference microphones and the inputs 106 from the error microphones.

In some demonstrative embodiments, analysis may be performed with respect to the influence of positions of the reference microphones providing inputs 104 and the air velocity in the ducts of the HVAC system 120 on ANC performance of ANC system 100 at a position of the error microphones providing inputs 106.

According to these analyses, it is demonstrated that a reference signal 104 obtained from a reference microphone may be influenced by a local turbulent flow, which may introduce unwanted noise into the ANC system 100, for example, when the reference microphone is located at a high airflow environment. This noise may decrease a correlation between the reference signal 104 and the noise emitted outside the HVAC system 120. This reduced correlation may result in degraded ANC performance.

Figure 10:
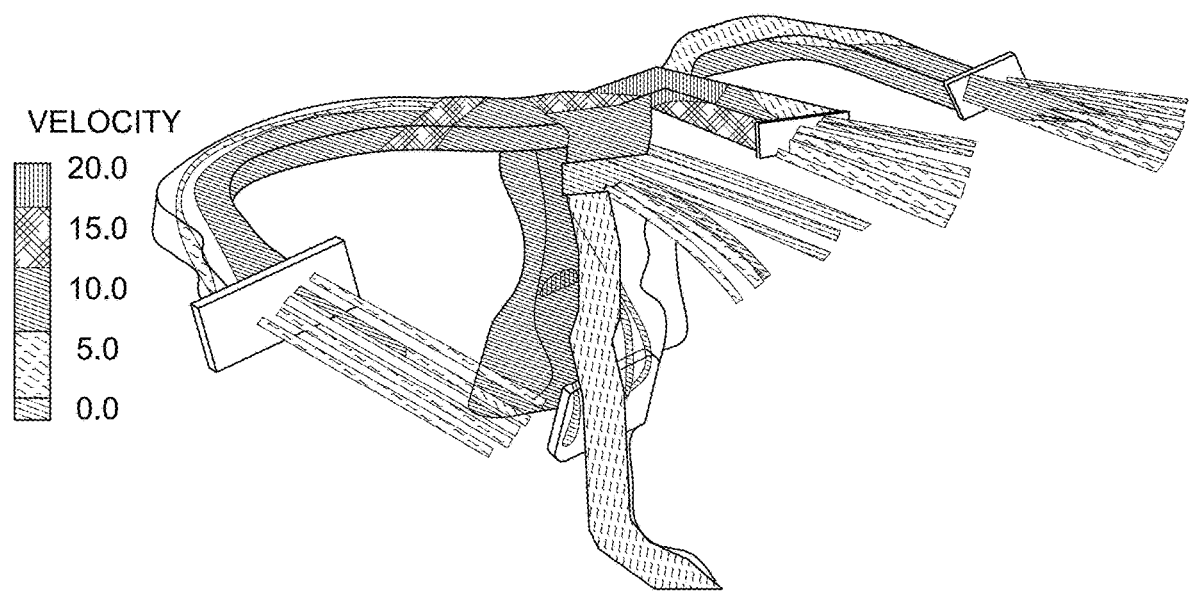
FIG. 10 is a schematic illustration of an air velocity map of a Heating, Ventilation and Air Conditioning (HVAC) system, in accordance with some demonstrative embodiments.

Reference is made to FIG. 10, which schematically illustrates an air velocity map of an HVAC system, e.g., in accordance with some demonstrative embodiments.

As shown in FIG. 10, there may be one or more high airflow environments in the HVAC system, for example, at or near bends in the air ducts of the HVAC system. For example, the ANC controller 193 (FIG. 1) may be configured to generate the sound control signal 109, while taking these high airflow environments into consideration, for example, based on the HAVE input 129 (FIG. 1), e.g., as described above.

Figure 11:
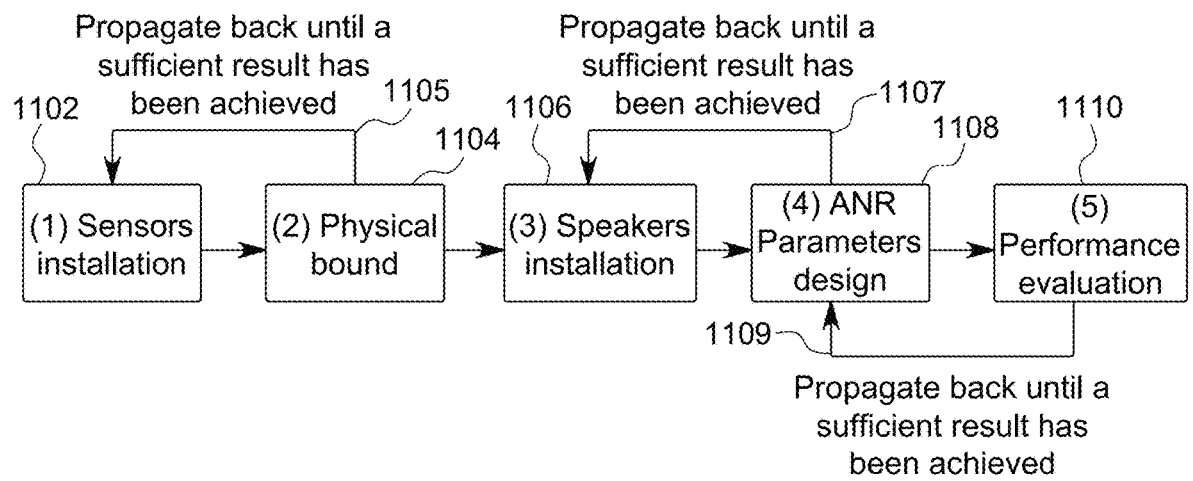
FIG. 11 is a schematic flow-chart illustration of a method of installation of components of an ANC system, in accordance with some demonstrative embodiments.

Reference is made to FIG. 11, which schematically illustrates a method of installation of components of an ANC system, in accordance with some demonstrative embodiments. For example, one or more operations of the method of FIG. 11 may be performed, for example, when installing one or more components of ANC system 100 (FIG. 1).

In some demonstrative embodiments, as indicated at block 1102, the method may include sensor installation, for example, installation of reference microphones 604 (FIG. 6).

In some demonstrative embodiments, as indicated at block 1104, the method may include determining a physical bound of the sensors.

In some demonstrative embodiments, as indicated by arrow 1105, the method may include propagating over blocks 1102 and 1104, for example, to achieve a suitable result of the physical bound of the sensors.

In some demonstrative embodiments, as indicated at block 1106, the method may include speaker installation, for example, installation of speakers 608 (FIG. 6).

In some demonstrative embodiments, as indicated at block 1108, the method may include determining Active Noise Reduction (ANR) parameters.

In some demonstrative embodiments, as indicated by arrow 1107, the method may include propagating over blocks 1106 and 1108, for example, to achieve a suitable result of the ANR parameters.

In some demonstrative embodiments, as indicated at block 1110, the method may include performing a performance evaluation.

In some demonstrative embodiments, as indicated by arrow 1109, the method may include propagating over blocks 1108 and 1110, for example, to achieve a suitable result of the performance.

In some demonstrative embodiments, one or more operations to install the components of an ANC system, e.g., one or more components of ANC system 100 (FIG. 1), may be performed, for example, according to the following table:

TABLE 1

| # | Main goal | Active Noise Reduction (ANR) Tasks Involved | Propagate back when |
|---|---|---|---|
| 1 | Mechanical installation of reference sensors | NA | NA |
| 2 | Expose noise sources and optimize Noise Vibration Harness (NVH) package | Multipath Transfer Function (MTF), Multiple Coherence | Insufficient potential |
| 3 | Mechanical installation of speakers | NA | NA |
| 4 | Calculate an optimal ANR parameters set | STF, ANR estimation | Poor speaker performance |
| 5 | To hit the theoretical bound with the ANR | ANR Run | Suboptimal ANR |

Table 1

Figure 12:
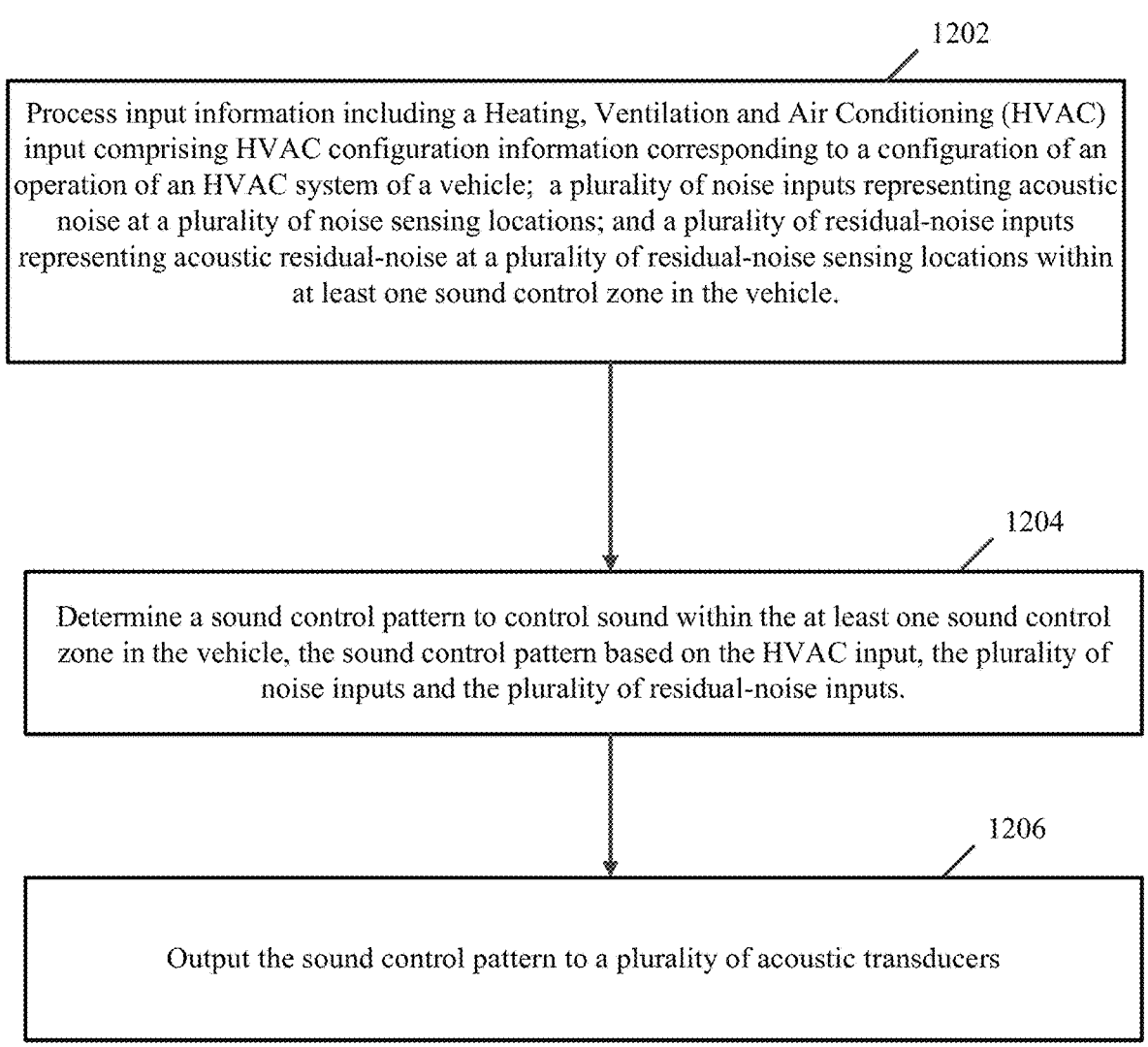
FIG. 12 is a schematic flow-chart illustration of a method of sound control, in accordance with some demonstrative embodiments.

Reference is made to FIG. 12, which illustrates a method of sound control. For example, one or more of the operations of FIG. 12 may be performed by one or more components of ANC system 100 (FIG. 1), controller 102 (FIG. 1), controller 193 (FIG. 1), controller 300 (FIG. 3), prediction unit 400 (FIG. 4), and/or controller 500 (FIG. 5).

In some demonstrative embodiments, as indicated at block 1202, the method may include processing input information including, for example, an HVAC input including HVAC configuration information corresponding to a configuration of an operation of an HVAC system of a vehicle; a plurality of noise inputs representing acoustic noise at a plurality of noise sensing locations; and/or a plurality of residual-noise inputs representing acoustic residual-noise at a plurality of residual-noise sensing locations within at least one sound control zone in the vehicle. For example, controller 193 (FIG. 1) may be configured to process input information 195 (FIG. 1) including the noise inputs 104 (FIG. 1), residual-noise inputs 106 (FIG. 1), and/or the HVAC input 129 (FIG. 1), e.g., as described above.

In some demonstrative embodiments, as indicated at block 1204, the method may include determining a sound control pattern to control sound within the at least one sound control zone in the vehicle, the sound control pattern based on the HVAC input, the plurality of noise inputs and the plurality of residual-noise inputs. For example, controller 193 (FIG. 1) may be configured to determine the sound control pattern based on the input information 195 (FIG. 1)

including the noise inputs 104 (FIG. 1), residual-noise inputs 106 (FIG. 1), and/or the HVAC input 129 (FIG. 1), e.g., as described above.

In some demonstrative embodiments, as indicated at block 1206, the method may include outputting the sound control pattern to a plurality of acoustic transducers. For example, controller 193 (FIG. 1) may be configured to output sound control signal 109 (FIG. 1 to control acoustic transducers 108 (FIG. 1) to generate the sound control pattern, e.g., as described above.

Reference is made to FIG. 13, which schematically illustrates a product of manufacture 1300, in accordance with some demonstrative embodiments. Product 1300 may include one or more tangible computer-readable ("machine readable") non-transitory storage media 1302, which may include computer-executable instructions, e.g., implemented by logic 1304, operable to, when executed by at least one processor, e.g., computer processor, enable the at least one processor to implement one or more operations of ANC system 100 (FIG. 1), controller 102 (FIG. 1), controller 193 (FIG. 1), controller 300 (FIG. 3), prediction unit 400 (FIG. 4), and/or controller 500 (FIG. 5), to perform one or more operations, and/or to perform, trigger and/or implement one or more operations, communications and/or functionalities described above with reference to FIGS. 1, 2, 3, 4, 5, 6, 7, 8, 9, 10, 11 and/or 12, and/or one or more operations described herein. The phrases "non-transitory machine-readable media (medium)" and "computer-readable non-transitory storage media (medium)" are directed to include all computer-readable media, with the sole exception being a transitory propagating signal.

In some demonstrative embodiments, product 1300 and/or storage media 1302 may include one or more types of computer-readable storage media capable of storing data, including volatile memory, non-volatile memory, removable or non-removable memory, erasable or non-erasable memory, writeable or re-writeable memory, and the like. For example, storage media 1302 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 1304 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 1304 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising an input to receive input information, the input information comprising a Heating, Ventilation and Air Conditioning (HVAC) input comprising HVAC configuration information corresponding to a configuration of an operation of an HVAC system of a vehicle; a plurality of noise inputs representing acoustic noise at a plurality of noise sensing locations; and a plurality of residual-noise inputs representing acoustic residual-noise at a plurality of residual-noise sensing locations within at least one sound control zone in the vehicle; a controller comprising logic and circuitry configured to determine a sound control pattern to control sound within the at least one sound control zone in the vehicle, the controller configured to determine the sound control pattern based on the HVAC input, the plurality of noise inputs and the plurality of residual-noise inputs; and an output to output the sound control pattern to a plurality of acoustic transducers.

Example 2 includes the subject matter of Example 1, and optionally, wherein the controller is configured to determine the sound control pattern based on the HVAC input such that the sound control pattern is to reduce or eliminate noise from the HVAC system in the at least one sound control zone.

Example 3 includes the subject matter of Example 1 or 2, and optionally, wherein the controller is configured to determine a first sound control pattern based on first HVAC configuration information representing a first configuration of the operation of the HVAC system, and to determine a second sound control pattern, different from the first sound control pattern, based on second HVAC configuration information representing a second configuration of the operation of the HVAC system different from the first configuration of the operation of the HVAC system.

Example 4 includes the subject matter of any one of Examples 1-3, and optionally, wherein the controller is configured to dynamically update the sound control pattern based on a change in the HVAC configuration information representing a change in the configuration of the operation of the HVAC system.

Example 5 includes the subject matter of any one of Examples 1-4, and optionally, wherein the controller is configured to determine an HVAC noise control profile based on the HVAC configuration information, and to determine the sound control pattern based on the HVAC noise control profile.

Example 6 includes the subject matter of Example 5, and optionally, wherein the HVAC noise control profile comprises a setting of one or more sound control parameters, the controller configured to determine the sound control pattern based on the setting of the one or more sound control parameters.

Example 7 includes the subject matter of any one of Examples 1-6, and optionally, comprising a memory to store a plurality of HVAC noise control profiles corresponding to a plurality of HVAC operation configurations, respectively, an HVAC noise control profile comprising a setting of one or more sound control parameters corresponding to an HVAC operation configuration of the plurality of HVAC operation configurations, wherein the controller is configured to select from the plurality of HVAC noise control profiles a selected HVAC noise control profile based on the HVAC configuration information, and to determine the sound control pattern based on the selected HVAC noise control profile.

Example 8 includes the subject matter of any one of Examples 1-7, and optionally, wherein the controller is configured to determine a setting of one or more sound control parameters based on the HVAC input, and to determine the sound control pattern based on the setting of the one or more sound control parameters.

Example 9 includes the subject matter of Example 8, and optionally, wherein the setting of the one or more sound control parameters comprises a prediction filter setting for determining the sound control pattern based on the plurality of noise inputs and the plurality of residual-noise inputs.

Example 10 includes the subject matter of Example 8 or 9, and optionally, wherein the setting of the one or more sound control parameters comprises a prediction filter weight vector to be applied for determining the sound control pattern based on the plurality of noise inputs and the plurality of residual-noise inputs.

Example 11 includes the subject matter of Example 10, and optionally, wherein the setting of the one or more sound control parameters comprises an update rate parameter for updating the prediction filter weight vector.

Example 12 includes the subject matter of any one of Examples 8-11, and optionally, wherein the setting of the one or more sound control parameters comprises one or more path transfer functions to be applied for determining the sound control pattern based on the plurality of noise inputs and the plurality of residual-noise inputs.

Example 13 includes the subject matter of any one of Examples 1-12, and optionally, wherein the plurality of noise sensing locations comprises a plurality of HVAC noise sensing locations, which are defined with respect to one or more components of the HVAC system.

Example 14 includes the subject matter of Example 13, and optionally, wherein the plurality of HVAC noise sensing locations comprise one or more of a location of a blower of the HVAC system, a location of a fan of the HVAC system, a location of a compressor of the HVAC system, a location of an air outlet of the HVAC system, or a location in an air duct of the HVAC system.

Example 15 includes the subject matter of Example 13 or 14, and optionally, wherein the plurality of HVAC noise sensing locations comprises a location of a curved portion of an air duct of the HVAC system.

Example 16 includes the subject matter of any one of Examples 1-15, and optionally, wherein the HVAC configuration information comprises HVAC mode information corresponding to a mode of operation of the HVAC system, the controller configured to determine the sound control pattern based on the HVAC mode information.

Example 17 includes the subject matter of Example 16, and optionally, wherein the HVAC mode information corresponds to at least one of an HVAC heating mode, an HVAC cooling mode, an HVAC defrosting mode, an HVAC fan mode, an HVAC ventilation mode, an HVAC dry mode, or an HVAC defogging mode.

Example 18 includes the subject matter of any one of Examples 1-17, and optionally, wherein the HVAC configuration information comprises HVAC fan information corresponding to an operation of at least one of a blower or fan of the HVAC system, the controller configured to determine the sound control pattern based on the HVAC fan information.

Example 19 includes the subject matter of Example 18, and optionally, wherein the HVAC fan information corresponds to at least one of a fan turbo mode, a fan quit mode, or a fan speed.

Example 20 includes the subject matter of any one of Examples 1-19, and optionally, wherein the HVAC configuration information comprises HVAC climate information corresponding to a climate setting of the HVAC system, the controller configured to determine the sound control pattern based on the HVAC climate information.

Example 21 includes the subject matter of Example 20, and optionally, wherein the HVAC climate information corresponds to at least one of a temperature setting, or a humidity setting.

Example 22 includes the subject matter of any one of Examples 1-21, and optionally, wherein the input is configured to receive the HVAC input via at least one of a Controller Area Network (CAN) bus of the vehicle, an A to B (A2B) bus of the vehicle, a Media Oriented Systems Transport (MOST) bus of the vehicle, or an Ethernet bus of the vehicle.

Example 23 includes a vehicle comprising a Heating, Ventilation and Air Conditioning (HVAC) system to control a climate in the vehicle; and a sound control system configured to control sound within at least one sound control zone in the vehicle, the sound control system comprising a plurality of accosting transducers; a plurality of noise sensors to generate a plurality of noise inputs representing acoustic noise at a plurality of noise sensing locations; a plurality of residual-noise sensors to generate a plurality of residual-noise inputs representing acoustic residual-noise at a plurality of residual-noise sensing locations within the at least one sound control zone; and a controller comprising logic and circuitry configured to determine a sound control pattern to control sound within the at least one sound control zone and to output the sound control pattern to the plurality of acoustic transducers, the controller configured to determine the sound control pattern based on the plurality of noise inputs, the plurality of residual-noise inputs, and an HVAC input comprising HVAC configuration information corresponding to a configuration of an operation of the HVAC system.

Example 24 includes the subject matter of Example 23, and optionally, wherein the controller is configured to determine the sound control pattern based on the HVAC input such that the sound control pattern is to reduce or eliminate noise from the HVAC system in the at least one sound control zone.

Example 25 includes the subject matter of Example 23 or 24, and optionally, wherein the controller is configured to determine a first sound control pattern based on first HVAC configuration information representing a first configuration of the operation of the HVAC system, and to determine a second sound control pattern, different from the first sound control pattern, based on second HVAC configuration information representing a second configuration of the operation of the HVAC system different from the first configuration of the operation of the HVAC system.

Example 26 includes the subject matter of any one of Examples 23-25, and optionally, wherein the controller is configured to dynamically update the sound control pattern based on a change in the HVAC configuration information representing a change in the configuration of the operation of the HVAC system.

Example 27 includes the subject matter of any one of Examples 23-26, and optionally, wherein the controller is configured to determine an HVAC noise control profile based on the HVAC configuration information, and to determine the sound control pattern based on the HVAC noise control profile.

Example 28 includes the subject matter of Example 27, and optionally, wherein the HVAC noise control profile comprises a setting of one or more sound control parameters, the controller configured to determine the sound control pattern based on the setting of the one or more sound control parameters.

Example 29 includes the subject matter of any one of Examples 23-28, and optionally, wherein the sound control system comprises a memory to store a plurality of HVAC noise control profiles corresponding to a plurality of HVAC operation configurations, respectively, an HVAC noise control profile comprising a setting of one or more sound control parameters corresponding to an HVAC operation configuration of the plurality of HVAC operation configurations, wherein the controller is configured to select from the plurality of HVAC noise control profiles a selected HVAC noise control profile based on the HVAC configuration information, and to determine the sound control pattern based on the selected HVAC noise control profile.

Example 30 includes the subject matter of any one of Examples 23-29, and optionally, wherein the controller is configured to determine a setting of one or more sound control parameters based on the HVAC input, and to determine the sound control pattern based on the setting of the one or more sound control parameters.

Example 31 includes the subject matter of Example 30, and optionally, wherein the setting of the one or more sound control parameters comprises a prediction filter setting for determining the sound control pattern based on the plurality of noise inputs and the plurality of residual-noise inputs.

Example 32 includes the subject matter of Example 30 or 31, and optionally, wherein the setting of the one or more sound control parameters comprises a prediction filter weight vector to be applied for determining the sound control pattern based on the plurality of noise inputs and the plurality of residual-noise inputs.

Example 33 includes the subject matter of Example 32, and optionally, wherein the setting of the one or more sound control parameters comprises an update rate parameter for updating the prediction filter weight vector.

Example 34 includes the subject matter of any one of Examples 30-33, and optionally, wherein the setting of the one or more sound control parameters comprises one or more path transfer functions to be applied for determining the sound control pattern based on the plurality of noise inputs and the plurality of residual-noise inputs.

Example 35 includes the subject matter of any one of Examples 23-34, and optionally, wherein the plurality of noise sensing locations comprises a plurality of HVAC noise sensing locations, which are defined with respect to one or more components of the HVAC system.

Example 36 includes the subject matter of Example 35, and optionally, wherein the plurality of HVAC noise sensing locations comprise one or more of a location of a blower of the HVAC system, a location of a fan of the HVAC system, a location of a compressor of the HVAC system, a location of an air outlet of the HVAC system, or a location in an air duct of the HVAC system.

Example 37 includes the subject matter of Example 35 or 36, and optionally, wherein the plurality of HVAC noise sensing locations comprises a location of a curved portion of an air duct of the HVAC system.

Example 38 includes the subject matter of any one of Examples 23-37, and optionally, wherein the HVAC configuration information comprises HVAC mode information corresponding to a mode of operation of the HVAC system, the controller configured to determine the sound control pattern based on the HVAC mode information.

Example 39 includes the subject matter of Example 38, and optionally, wherein the HVAC mode information corresponds to at least one of an HVAC heating mode, an HVAC cooling mode, an HVAC defrosting mode, an HVAC fan mode, an HVAC ventilation mode, an HVAC dry mode, or an HVAC defogging mode.

Example 40 includes the subject matter of any one of Examples 23-39, and optionally, wherein the HVAC configuration information comprises HVAC fan information corresponding to an operation of at least one of a blower or fan of the HVAC system, the controller configured to determine the sound control pattern based on the HVAC fan information.

Example 41 includes the subject matter of Example 40, and optionally, wherein the HVAC fan information corresponds to at least one of a fan turbo mode, a fan quit mode, or a fan speed.

Example 42 includes the subject matter of any one of Examples 23-41, and optionally, wherein the HVAC configuration information comprises HVAC climate information corresponding to a climate setting of the HVAC system, the controller configured to determine the sound control pattern based on the HVAC climate information.

Example 43 includes the subject matter of Example 42, and optionally, wherein the HVAC climate information corresponds to at least one of a temperature setting, or a humidity setting.

Example 44 includes the subject matter of any one of Examples 23-43, and optionally, wherein the input is configured to receive the HVAC input via at least one of a Controller Area Network (CAN) bus of the vehicle, an A to B (A2B) bus of the vehicle, a Media Oriented Systems Transport (MOST) bus of the vehicle, or an Ethernet bus of the vehicle.

Example 45 includes a method of controlling sound within at least one sound control zone in a vehicle, the method comprising receiving input information, the input information comprising a Heating, Ventilation and Air Conditioning (HVAC) input comprising HVAC configuration information corresponding to a configuration of an operation of an HVAC system of a vehicle; a plurality of noise inputs representing acoustic noise at a plurality of noise sensing locations; and a plurality of residual-noise inputs representing acoustic residual-noise at a plurality of residual-noise sensing locations within the at least one sound control zone; determining a sound control pattern to control sound within the at least one sound control zone based on the HVAC input, the plurality of noise inputs and the plurality of residual-noise inputs; and outputting the sound control pattern to a plurality of acoustic transducers.

Example 46 includes the subject matter of Example 45, and optionally, comprising determining the sound control pattern based on the HVAC input such that the sound control pattern is to reduce or eliminate noise from the HVAC system in the at least one sound control zone.

Example 47 includes the subject matter of Example 45 or 46, and optionally, comprising determining a first sound control pattern based on first HVAC configuration information representing a first configuration of the operation of the HVAC system, and determining a second sound control pattern, different from the first sound control pattern, based on second HVAC configuration information representing a second configuration of the operation of the HVAC system different from the first configuration of the operation of the HVAC system.

Example 48 includes the subject matter of any one of Examples 45-47, and optionally, comprising dynamically updating the sound control pattern based on a change in the HVAC configuration information representing a change in the configuration of the operation of the HVAC system.

Example 49 includes the subject matter of any one of Examples 45-48, and optionally, comprising determining an HVAC noise control profile based on the HVAC configuration information, and determining the sound control pattern based on the HVAC noise control profile.

Example 50 includes the subject matter of Example 49, and optionally, wherein the HVAC noise control profile comprises a setting of one or more sound control parameters, the method comprising determining the sound control pattern based on the setting of the one or more sound control parameters.

Example 51 includes the subject matter of any one of Examples 45-50, and optionally, comprising storing a plurality of HVAC noise control profiles corresponding to a plurality of HVAC operation configurations, respectively, an HVAC noise control profile comprising a setting of one or more sound control parameters corresponding to an HVAC operation configuration of the plurality of HVAC operation configurations; selecting from the plurality of HVAC noise control profiles a selected HVAC noise control profile based on the HVAC configuration information; and determining the sound control pattern based on the selected HVAC noise control profile.

Example 52 includes the subject matter of any one of Examples 45-51, and optionally, comprising determining a setting of one or more sound control parameters based on the HVAC input, and determining the sound control pattern based on the setting of the one or more sound control parameters.

Example 53 includes the subject matter of Example 52, and optionally, wherein the setting of the one or more sound control parameters comprises a prediction filter setting for determining the sound control pattern based on the plurality of noise inputs and the plurality of residual-noise inputs.

Example 54 includes the subject matter of Example 52 or 53, and optionally, wherein the setting of the one or more sound control parameters comprises a prediction filter weight vector to be applied for determining the sound control pattern based on the plurality of noise inputs and the plurality of residual-noise inputs.

Example 55 includes the subject matter of Example 54, and optionally, wherein the setting of the one or more sound control parameters comprises an update rate parameter for updating the prediction filter weight vector.

Example 56 includes the subject matter of any one of Examples 52-55, and optionally, wherein the setting of the one or more sound control parameters comprises one or more path transfer functions to be applied for determining the sound control pattern based on the plurality of noise inputs and the plurality of residual-noise inputs.

Example 57 includes the subject matter of any one of Examples 45-56, and optionally, wherein the plurality of noise sensing locations comprises a plurality of HVAC noise sensing locations, which are defined with respect to one or more components of the HVAC system.

Example 58 includes the subject matter of Example 57, and optionally, wherein the plurality of HVAC noise sensing locations comprise one or more of a location of a blower of the HVAC system, a location of a fan of the HVAC system, a location of a compressor of the HVAC system, a location of an air outlet of the HVAC system, or a location in an air duct of the HVAC system.

Example 59 includes the subject matter of Example 57 or 58, and optionally, wherein the plurality of HVAC noise sensing locations comprises a location of a curved portion of an air duct of the HVAC system.

Example 60 includes the subject matter of any one of Examples 45-59, and optionally, wherein the HVAC configuration information comprises HVAC mode information corresponding to a mode of operation of the HVAC system, the method comprising determining the sound control pattern based on the HVAC mode information.

Example 61 includes the subject matter of Example 60, and optionally, wherein the HVAC mode information corresponds to at least one of an HVAC heating mode, an HVAC cooling mode, an HVAC defrosting mode, an HVAC fan mode, an HVAC ventilation mode, an HVAC dry mode, or an HVAC defogging mode.

Example 62 includes the subject matter of any one of Examples 45-61, and optionally, wherein the HVAC configuration information comprises HVAC fan information corresponding to an operation of at least one of a blower or fan of the HVAC system, the method comprising determining the sound control pattern based on the HVAC fan information.

Example 63 includes the subject matter of Example 62, and optionally, wherein the HVAC fan information corresponds to at least one of a fan turbo mode, a fan quit mode, or a fan speed.

Example 64 includes the subject matter of any one of Examples 45-63, and optionally, wherein the HVAC configuration information comprises HVAC climate information corresponding to a climate setting of the HVAC system, the method comprising determining the sound control pattern based on the HVAC climate information.

Example 65 includes the subject matter of Example 64, and optionally, wherein the HVAC climate information corresponds to at least one of a temperature setting, or a humidity setting.

Example 66 includes the subject matter of any one of Examples 45-65, and optionally, comprising receiving the HVAC input via at least one of a Controller Area Network (CAN) bus of the vehicle, an A to B (A2B) bus of the vehicle, a Media Oriented Systems Transport (MOST) bus of the vehicle, or an Ethernet bus of the vehicle.

Example 67 includes a product comprising one or more tangible computer-readable non-transitory storage media comprising computer-executable instructions operable to, when executed by at least one processor, enable the at least one processor to cause a sound control system to control sound within at least one sound control zone in a vehicle, the instructions, when executed, to cause the noise control system to process input information, the input information comprising a Heating, Ventilation and Air Conditioning (HVAC) input comprising HVAC configuration information corresponding to a configuration of an operation of an HVAC system of a vehicle; a plurality of noise inputs representing acoustic noise at a plurality of noise sensing locations; and a plurality of residual-noise inputs representing acoustic residual-noise at a plurality of residual-noise sensing locations within the at least one sound control zone; determine a sound control pattern to control sound within the at least one sound control zone based on the HVAC input, the plurality of noise inputs and the plurality of residual-noise inputs; and output the sound control pattern to a plurality of acoustic transducers.

Example 68 includes the subject matter of Example 67, and optionally, wherein the instructions, when executed, result in determining the sound control pattern based on the HVAC input such that the sound control pattern is to reduce or eliminate noise from the HVAC system in the at least one sound control zone.

Example 69 includes the subject matter of Example 67 or 68, and optionally, wherein the instructions, when executed, result in determining a first sound control pattern based on first HVAC configuration information representing a first configuration of the operation of the HVAC system, and determining a second sound control pattern, different from the first sound control pattern, based on second HVAC configuration information representing a second configuration of the operation of the HVAC system different from the first configuration of the operation of the HVAC system.

Example 70 includes the subject matter of any one of Examples 67-69, and optionally, wherein the instructions, when executed, result in dynamically updating the sound control pattern based on a change in the HVAC configuration information representing a change in the configuration of the operation of the HVAC system.

Example 71 includes the subject matter of any one of Examples 67-70, and optionally, wherein the instructions, when executed, result in determining an HVAC noise control profile based on the HVAC configuration information, and determining the sound control pattern based on the HVAC noise control profile.

Example 72 includes the subject matter of Example 71, and optionally, wherein the HVAC noise control profile comprises a setting of one or more sound control parameters, wherein the instructions, when executed, result in determining the sound control pattern based on the setting of the one or more sound control parameters.

Example 73 includes the subject matter of any one of Examples 67-72, and optionally, wherein the instructions, when executed, result in storing a plurality of HVAC noise control profiles corresponding to a plurality of HVAC operation configurations, respectively, an HVAC noise control profile comprising a setting of one or more sound control parameters corresponding to an HVAC operation configuration of the plurality of HVAC operation configurations; selecting from the plurality of HVAC noise control profiles a selected HVAC noise control profile based on the HVAC configuration information; and determining the sound control pattern based on the selected HVAC noise control profile.

Example 74 includes the subject matter of any one of Examples 67-73, and optionally, wherein the instructions, when executed, result in determining a setting of one or more sound control parameters based on the HVAC input, and determining the sound control pattern based on the setting of the one or more sound control parameters.

Example 75 includes the subject matter of Example 74, and optionally, wherein the setting of the one or more sound control parameters comprises a prediction filter setting for determining the sound control pattern based on the plurality of noise inputs and the plurality of residual-noise inputs.

Example 76 includes the subject matter of Example 74 or 75, and optionally, wherein the setting of the one or more sound control parameters comprises a prediction filter weight vector to be applied for determining the sound control pattern based on the plurality of noise inputs and the plurality of residual-noise inputs.

Example 77 includes the subject matter of Example 76, and optionally, wherein the setting of the one or more sound control parameters comprises an update rate parameter for updating the prediction filter weight vector.

Example 78 includes the subject matter of any one of Examples 74-77, and optionally, wherein the setting of the one or more sound control parameters comprises one or more path transfer functions to be applied for determining the sound control pattern based on the plurality of noise inputs and the plurality of residual-noise inputs.

Example 79 includes the subject matter of any one of Examples 67-78, and optionally, wherein the plurality of noise sensing locations comprises a plurality of HVAC noise sensing locations, which are defined with respect to one or more components of the HVAC system.

Example 80 includes the subject matter of Example 79, and optionally, wherein the plurality of HVAC noise sensing locations comprise one or more of a location of a blower of the HVAC system, a location of a fan of the HVAC system, a location of a compressor of the HVAC system, a location of an air outlet of the HVAC system, or a location in an air duct of the HVAC system.

Example 81 includes the subject matter of Example 79 or 80, and optionally, wherein the plurality of HVAC noise sensing locations comprises a location of a curved portion of an air duct of the HVAC system.

Example 82 includes the subject matter of any one of Examples 67-81, and optionally, wherein the HVAC configuration information comprises HVAC mode information corresponding to a mode of operation of the HVAC system, wherein the instructions, when executed, result in determining the sound control pattern based on the HVAC mode information.

Example 83 includes the subject matter of Example 82, and optionally, wherein the HVAC mode information corresponds to at least one of an HVAC heating mode, an HVAC cooling mode, an HVAC defrosting mode, an HVAC fan mode, an HVAC ventilation mode, an HVAC dry mode, or an HVAC defogging mode.

Example 84 includes the subject matter of any one of Examples 67-83, and optionally, wherein the HVAC configuration information comprises HVAC fan information corresponding to an operation of at least one of a blower or fan of the HVAC system, wherein the instructions, when executed, result in determining the sound control pattern based on the HVAC fan information.

Example 85 includes the subject matter of Example 84, and optionally, wherein the HVAC fan information corresponds to at least one of a fan turbo mode, a fan quit mode, or a fan speed.

Example 86 includes the subject matter of any one of Examples 67-85, and optionally, wherein the HVAC configuration information comprises HVAC climate information corresponding to a climate setting of the HVAC system, wherein the instructions, when executed, result in determining the sound control pattern based on the HVAC climate information.

Example 87 includes the subject matter of Example 86, and optionally, wherein the HVAC climate information corresponds to at least one of a temperature setting, or a humidity setting.

Example 88 includes the subject matter of any one of Examples 67-87, and optionally, wherein the instructions, when executed, result in receiving the HVAC input via at least one of a Controller Area Network (CAN) bus of the vehicle, an A to B (A2B) bus of the vehicle, a Media Oriented Systems Transport (MOST) bus of the vehicle, or an Ethernet bus of the vehicle.

Example 89 includes an apparatus of controlling sound within at least one sound control zone in a vehicle, the apparatus comprising means for receiving input information, the input information comprising a Heating, Ventilation and Air Conditioning (HVAC) input comprising HVAC configuration information corresponding to a configuration of an operation of an HVAC system of a vehicle; a plurality of noise inputs representing acoustic noise at a plurality of noise sensing locations; and a plurality of residual-noise inputs representing acoustic residual-noise at a plurality of residual-noise sensing locations within the at least one sound control zone; means for determining a sound control pattern to control sound within the at least one sound control zone based on the HVAC input, the plurality of noise inputs and the plurality of residual-noise inputs; and means for outputting the sound control pattern to a plurality of acoustic transducers.

Example 90 includes the subject matter of Example 89, and optionally, comprising means for determining the sound control pattern based on the HVAC input such that the sound control pattern is to reduce or eliminate noise from the HVAC system in the at least one sound control zone.

Example 91 includes the subject matter of Example 89 or 90, and optionally, comprising means for determining a first sound control pattern based on first HVAC configuration information representing a first configuration of the operation of the HVAC system, and determining a second sound control pattern, different from the first sound control pattern, based on second HVAC configuration information representing a second configuration of the operation of the HVAC system different from the first configuration of the operation of the HVAC system.

Example 92 includes the subject matter of any one of Examples 89-91, and optionally, comprising means for dynamically updating the sound control pattern based on a change in the HVAC configuration information representing a change in the configuration of the operation of the HVAC system.

Example 93 includes the subject matter of any one of Examples 89-92, and optionally, comprising means for determining an HVAC noise control profile based on the HVAC configuration information, and determining the sound control pattern based on the HVAC noise control profile.

Example 94 includes the subject matter of Example 93, and optionally, wherein the HVAC noise control profile comprises a setting of one or more sound control parameters, the apparatus comprising means for determining the sound control pattern based on the setting of the one or more sound control parameters.

Example 95 includes the subject matter of any one of Examples 89-94, and optionally, comprising means for storing a plurality of HVAC noise control profiles corresponding to a plurality of HVAC operation configurations, respectively, an HVAC noise control profile comprising a setting of one or more sound control parameters corresponding to an HVAC operation configuration of the plurality of HVAC operation configurations; selecting from the plurality of HVAC noise control profiles a selected HVAC noise control profile based on the HVAC configuration information; and determining the sound control pattern based on the selected HVAC noise control profile.

Example 96 includes the subject matter of any one of Examples 89-95, and optionally, comprising means for determining a setting of one or more sound control parameters based on the HVAC input, and determining the sound control pattern based on the setting of the one or more sound control parameters.

Example 97 includes the subject matter of Example 96, and optionally, wherein the setting of the one or more sound control parameters comprises a prediction filter setting for determining the sound control pattern based on the plurality of noise inputs and the plurality of residual-noise inputs.

Example 98 includes the subject matter of Example 96 or 97, and optionally, wherein the setting of the one or more sound control parameters comprises a prediction filter weight vector to be applied for determining the sound control pattern based on the plurality of noise inputs and the plurality of residual-noise inputs.

Example 99 includes the subject matter of Example 98, and optionally, wherein the setting of the one or more sound control parameters comprises an update rate parameter for updating the prediction filter weight vector.

Example 100 includes the subject matter of any one of Examples 96-99, and optionally, wherein the setting of the one or more sound control parameters comprises one or more path transfer functions to be applied for determining the sound control pattern based on the plurality of noise inputs and the plurality of residual-noise inputs.

Example 101 includes the subject matter of any one of Examples 89-100, and optionally, wherein the plurality of noise sensing locations comprises a plurality of HVAC noise sensing locations, which are defined with respect to one or more components of the HVAC system.

Example 102 includes the subject matter of Example 101, and optionally, wherein the plurality of HVAC noise sensing locations comprise one or more of a location of a blower of the HVAC system, a location of a fan of the HVAC system, a location of a compressor of the HVAC system, a location of an air outlet of the HVAC system, or a location in an air duct of the HVAC system.

Example 103 includes the subject matter of Example 101 or 102, and optionally, wherein the plurality of HVAC noise sensing locations comprises a location of a curved portion of an air duct of the HVAC system.

Example 104 includes the subject matter of any one of Examples 89-103, and optionally, wherein the HVAC configuration information comprises HVAC mode information corresponding to a mode of operation of the HVAC system, the apparatus comprising means for determining the sound control pattern based on the HVAC mode information.

Example 105 includes the subject matter of Example 104, and optionally, wherein the HVAC mode information corresponds to at least one of an HVAC heating mode, an HVAC cooling mode, an HVAC defrosting mode, an HVAC fan mode, an HVAC ventilation mode, an HVAC dry mode, or an HVAC defogging mode.

Example 106 includes the subject matter of any one of Examples 89-105, and optionally, wherein the HVAC configuration information comprises HVAC fan information corresponding to an operation of at least one of a blower or fan of the HVAC system, the apparatus comprising means for determining the sound control pattern based on the HVAC fan information.

Example 107 includes the subject matter of Example 106, and optionally, wherein the HVAC fan information corresponds to at least one of a fan turbo mode, a fan quit mode, or a fan speed.

Example 108 includes the subject matter of any one of Examples 89-107, and optionally, wherein the HVAC configuration information comprises HVAC climate information corresponding to a climate setting of the HVAC system, the apparatus comprising means for determining the sound control pattern based on the HVAC climate information.

Example 109 includes the subject matter of Example 108, and optionally, wherein the HVAC climate information corresponds to at least one of a temperature setting, or a humidity setting.

Example 110 includes the subject matter of any one of Examples 89-109, and optionally, comprising means for receiving the HVAC input via at least one of a Controller Area Network (CAN) bus of the vehicle, an A to B (A2B) bus of the vehicle, a Media Oriented Systems Transport (MOST) bus of the vehicle, or an Ethernet bus of the vehicle.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
    an input to receive input information, the input information comprising:
        system bus information received via a system bus of a vehicle;
        a plurality of noise inputs representing acoustic noise at a plurality of noise sensing locations; and
        a plurality of residual-noise inputs representing acoustic residual-noise at a plurality of residual-noise sensing locations within a sound control zone in the vehicle;
    a controller comprising logic and circuitry configured to determine a sound control pattern to control sound within the sound control zone in the vehicle, the controller configured to determine the sound control pattern based on the system bus information, the plurality of noise inputs, and the plurality of residual-noise inputs, wherein the controller is configured to determine a path transfer function setting of one or more path transfer functions based on the system bus information, and to determine the sound control pattern based on the path transfer function setting; and
    an output to output the sound control pattern to a plurality of acoustic transducers.

2. The apparatus of claim 1, wherein the controller is configured to determine a prediction filter setting of at least one prediction filter based on the system bus information, and to determine the sound control pattern based on the prediction filter setting.

3. The apparatus of claim 2, wherein the prediction filter setting comprises a prediction filter weight vector to be applied by the prediction filter for determining the sound control pattern based on at least one of the plurality of noise inputs or the plurality of residual-noise inputs.

4. The apparatus of claim 3, wherein the prediction filter setting comprises an update rate parameter for updating the prediction filter weight vector.

5. The apparatus of claim 1, wherein the path transfer function setting of the one or more path transfer functions comprises a setting of a path transfer function representing an acoustic path between at least one acoustic transducer and at least one noise sensing location.

6. The apparatus of claim 1, wherein the system bus information comprises system information corresponding to a noise generating system of the vehicle, the controller configured to determine the sound control pattern based on the system information.

7. The apparatus of claim 6, wherein the controller is configured to determine the sound control pattern based on the system information such that the sound control pattern is to reduce or eliminate noise from the noise generating system in the sound control zone.

8. The apparatus of claim 1, wherein the system bus information comprises system setting information representing a setting of a system of the vehicle, the controller configured to determine the sound control pattern based on the system setting information.

9. The apparatus of claim 8, wherein the controller is configured to determine a first sound control pattern based on first system setting information representing a first setting of the system of the vehicle, and to determine a second sound control pattern, different from the first sound control pattern, based on second system setting information representing a second setting of the system of the vehicle different from the first setting of the system of the vehicle.

10. The apparatus of claim 8, wherein the controller is configured to dynamically update the sound control pattern based on a change in the system setting information representing a change in the setting of the system of the vehicle.

11. The apparatus of claim 1, wherein the system bus information comprises mode of operation information representing a mode of operation of a system of the vehicle, the controller configured to determine the sound control pattern based on the mode of operation information.

12. The apparatus of claim 11, wherein the controller is configured to determine a first sound control pattern based on first mode of operation information representing a first mode of operation of the system of the vehicle, and to determine a second sound control pattern, different from the first sound control pattern, based on second mode of operation information representing a second mode of operation of the system of the vehicle different from the first mode of operation of the system of the vehicle.

13. The apparatus of claim 11, wherein the controller is configured to dynamically update the sound control pattern based on a change in the mode of operation information representing a change in the mode of operation of the system of the vehicle.

14. The apparatus of claim 1, wherein the system bus information comprises speed information, the controller configured to determine the sound control pattern based on the speed information.

15. The apparatus of claim 1, wherein the controller is configured to determine a sound control profile based on the system bus information, and to determine the sound control pattern based on the sound control profile.

16. The apparatus of claim 15, wherein the sound control profile comprises a setting of one or more sound control parameters, the controller configured to determine the sound control pattern based on the setting of the one or more sound control parameters.

17. The apparatus of claim 1 comprising a memory to store a plurality of sound control profiles corresponding to a plurality of sound control configurations, respectively, wherein the controller is configured to select from the plurality of sound control profiles a selected sound control profile based on the system bus information, and to determine the sound control pattern based on the selected sound control profile.

18. The apparatus of claim 1, wherein the system bus information comprises at least one of Controller Area Network (CAN) bus information received via a CAN bus of the vehicle, A to B (A2B) bus information received via an A2B bus of the vehicle, Media Oriented Systems Transport (MOST) bus information received via a MOST bus of the vehicle, or Ethernet bus information received via an Ethernet bus of the vehicle.

19. A vehicle comprising:
a system bus to communicate information between a plurality of vehicular systems of the vehicle; and
a sound control system configured to control sound within a sound control zone in the vehicle, the sound control system comprising:
a plurality of acoustic transducers;
a plurality of noise sensors to generate a plurality of noise inputs representing acoustic noise at a plurality of noise sensing locations;
a plurality of residual-noise sensors to generate a plurality of residual-noise inputs representing acoustic residual-noise at a plurality of residual-noise sensing locations within the sound control zone; and
a controller comprising logic and circuitry configured to determine a sound control pattern to control sound within the sound control zone and to output the sound control pattern to the plurality of acoustic transducers, the controller configured to determine the sound control pattern based on the plurality of noise inputs, the plurality of residual-noise inputs, and system bus information received via the system bus of the vehicle, wherein the controller is configured to determine a path transfer function setting of one or more path transfer functions based on the system bus information, and to determine the sound control pattern based on the path transfer function setting.

20. The vehicle of claim 19, wherein the controller is configured to determine a prediction filter setting of at least one prediction filter based on the system bus information, and to determine the sound control pattern based on the prediction filter setting.

21. The vehicle of claim 19, wherein the system bus information comprises system information corresponding to a noise generating system of the vehicle, the controller configured to determine the sound control pattern based on the system information.

22. The vehicle of claim 19, wherein the system bus information comprises system setting information representing a setting of a system of the vehicle, the controller configured to determine the sound control pattern based on the system setting information.

23. A product comprising one or more tangible computer-readable non-transitory storage media comprising computer-executable instructions operable to, when executed by at least one processor, enable the at least one processor to cause a sound control system to control sound within a sound control zone in a vehicle, the instructions, when executed, to cause the sound control system to:
process input information, the input information comprising:
system bus information received via a system bus of the vehicle;
a plurality of noise inputs representing acoustic noise at a plurality of noise sensing locations; and
a plurality of residual-noise inputs representing acoustic residual-noise at a plurality of residual-noise sensing locations within the sound control zone in the vehicle;
determine a sound control pattern to control sound within the sound control zone based on the system bus information, the plurality of noise inputs and the plurality of residual-noise inputs, wherein the instructions, when executed, cause the sound control system to determine a path transfer function setting of one or more path transfer functions based on the system bus information, and to determine the sound control pattern based on the path transfer function setting; and
output the sound control pattern to a plurality of acoustic transducers.

24. The product of claim 23, wherein the instructions, when executed, cause the sound control system to determine a prediction filter setting of at least one prediction filter based on the system bus information, and to determine the sound control pattern based on the prediction filter setting.

25. The product of claim 23, wherein the system bus information comprises system information corresponding to a noise generating system of the vehicle, the instructions, when executed, cause the sound control system to determine the sound control pattern based on the system information.

26. The product of claim 23, wherein the system bus information comprises mode of operation information representing a mode of operation of a system of the vehicle, the instructions, when executed, cause the sound control system to determine the sound control pattern based on the mode of operation information.

* * * * *